United States Patent [19]
Osbourn

[11] Patent Number: 5,495,536
[45] Date of Patent: Feb. 27, 1996

[54] IMAGE PROCESSING SYSTEM AND METHOD FOR RECOGNIZING AND REMOVING SHADOWS FROM THE IMAGE OF A MONITORED SCENE

[75] Inventor: Gordon C. Osbourn, Albuquerque, N.M.

[73] Assignee: Sandia Corporation, Albuquerque, N.M.

[21] Appl. No.: 696,464

[22] Filed: May 8, 1991

[51] Int. Cl.$^6$ .................................................. G06K 9/48
[52] U.S. Cl. ........................ 382/199; 382/174; 382/274
[58] Field of Search .................................. 382/22, 49, 50, 382/174, 199, 274; 358/109; 356/376; 348/131

[56] References Cited

U.S. PATENT DOCUMENTS 3,701,095 10/1972 Yamaguchi et al. ..................... 382/49
4,804,842 2/1989 Nakajima et al. ....................... 382/22

OTHER PUBLICATIONS

Runge et al., "Electronic Synthesis of the Avian Retina", IEEE Trans on Bio–Medical Engineering, vol. BME–15, No. 3, Jul. 1968, pp. 138–151.
D. Marr & E. Hildreth, "Theory of Edge Detection", Proceedings of the Royal Society of London, vol. 207, 1980, pp. 187–217.
Andres Huertus & Gerard Medioni, "Detection of Intensity Changes with Subpixel Accuracy Using Laplacian–Graussian Masks", IEEE Transactions on Pattern Analysis & Machine Intelligence, vol. PAMI–8 No. 5, Sep. 1986, pp. 651–664.

*Primary Examiner*—Leo Boudreau
*Assistant Examiner*—Chris Kelley
*Attorney, Agent, or Firm*—Birch, Stewart, Kolasch & Birch

[57] ABSTRACT

The shadow contrast sensitivity of the human vision system is simulated by configuring information obtained from an image sensor so that the information may be evaluated with multiple pixel widths in order to produce a machine vision system able to distinguish between shadow edges and abrupt object edges. A second difference of the image intensity for each line of the image is developed and this second difference is used to screen out high frequency noise contributions from the final edge detection signals. These edge detection signals are constructed from first differences of the image intensity where the screening conditions are satisfied. The positional coincidence of oppositely signed maxima in the first difference signal taken from the right and the second difference signal taken from the left is used to detect the presence of an object edge. Alternatively, the effective number of responding operators (ENRO) may be utilized to determine the presence of object edges.

62 Claims, 19 Drawing Sheets

INTENSITY PROFILE

COMPUTED EDGE SIGNALS

INTENSITY PROFILE

COMPUTED EDGE SIGNALS

IMAGE PROCESSING SYSTEM AND METHOD FOR RECOGNIZING AND REMOVING SHADOWS FROM THE IMAGE OF A MONITORED SCENE

FIELD OF INVENTION

The present invention relates to the processing of video images. More particularly, the present invention relates to the processing of video images from a video sensor to distinguish object features from shadows.

BACKGROUND OF THE INVENTION

There has been a great deal of study of the principles of edge detection and contrast perception both in the human visual system and for the purpose of enhancing machine vision. While there has been a great deal of work in these areas, little work has been addressed to the problem of distinguishing illumination variations (e.g. shadows) from reflectance variations. This difficulty in distinguishing illumination variations from reflectance variations results in the difficulty of recognizing object features as distinguished from illumination variations both for the human visual system, and in machine vision systems. Nevertheless, the human visual system is remarkably successful in separating contrast variation due to variation in illumination from reflectance magnitude changes due to the physical configuration of the scene being viewed.

Current machine vision systems exhibit undesired sensitivity to varying illumination. For current machine vision systems to be useful, the illumination of the viewed scene must be closely controlled to eliminate shadows and to make the desired features more prominent than other parts of the scene. Accordingly, machine vision systems are not particularly robust against varying illumination conditions such as encountered in normal outdoor scenes or in any location where illumination is not fully controlled. For this reason, current applications of industrial vision systems utilize closely controlled lighting. However, it has been long desirable to utilize machine vision systems in environments where the lighting is not well controlled. Current vision systems are unable to distinguish objects edges from shadows and thus are not generally useful in such an environment. A need in the art exists for a vision system which is capable of distinguishing shadows and abrupt object edges so that the system may be utilized without the need to closely control lighting. Such a system would be useful in a variety of areas including, but not limited to, the control of robotic manipulators, intrusion detection alarms and mechanical sorters.

OBJECTS OF THE INVENTION

It is an object of the present invention to enable the recognition of shadows in a monitored scene so that shadow edges may be distinguished from object edges.

It is another object of the present invention to distinguish between the so-called mach edges produced by shadows and the edges of objects in a monitored scene.

It is an object of the present invention to perform above-mentioned objects by simulating the shadow contrast sensitivity of the human eye and emulating shadow detection techniques of the human vision system.

It is a further object of the present invention to perform the above-objects by producing a first difference signal related to the change of image intensity of the monitored scene in at least two diverse directions, and to process this first difference signal after suppressing the high frequency aliasing response thereof through the use of second difference screening signals so as to recognize mach edges and distinguish them from object edges.

It is still another object of the present invention to perform the above mentioned objects despite the existence of undesired noise, both in the image to be processed and the processing system.

These and other objects of the present invention are achieved by the image processing system and method of the present invention as will be described in detail in the present specification.

SUMMARY OF THE INVENTION

In its most basic sense, the present invention is directed to a method and system of distinguishing object edges from shadows in a monitored scene by configuring a video sensor or its output to simulate the shadow contrast sensitivity of the human vision system and using the configured video sensor to monitor image contrast to distinguish between objects edges and mach edges produced by shadows. This basic objective of the present application may be performed by configuring the video sensor so as to effectively provide multiple pixel widths in repetitive scans of the monitored scene and processing the image intensity information. The image intensity information is processed by taking the first difference of the image's intensity signal in first and second opposed directions along each line of the image when the second deviation of image intensity, the screening signal, meets certain criteria, and processing the first difference signals to form first and second directional edge detection signals.

The processing of the first difference signal can be performed by several methods according to the teachings of the present invention. For each pixel size the first difference of image intensity is used to produce first and second directional edge detection signals associated with that pixel size when the second difference signal meets certain criteria. The second difference signals (screening signals) are used to determine where to add up the first difference signals and are used to partially suppress the higher frequency aliasing response of the first and second edge detection signals. The first and second directional edge detection signals for each pixel width, as mentioned above, may be summed to produce first and second total directional signals. Maxima of these first and second total directional edge detection signals are then detected. The presence of an object edge may then be determined by the substantial positional coincidence of oppositely signed maxima in the sums obtained in both the first and second directions. Verification that an object edge exists may be further performed by determining that there are no additional maxima closely proximate to the positionally coincident maxima as mentioned above.

An alternative method of detecting the presence of object edges may be performed by determining the number of the opposed directional first difference signals, screened by the second difference screening signals referred to as edge operators, which exceed a threshold or predetermined number. Alternatively, according to the teachings of the present invention, mach edges may be detected by detecting positionally separated oppositely signed maxima pair within each of the first and second directional first difference signals and determining whether the maxima pair within both the first and second opposed directional first difference signals are of the same sign and positionally correspond.

The present invention is further directed to a system for performing the method as outlined above.

BRIEF DESCRIPTION OF THE DRAWINGS

The system and method of the present invention will be more fully understood with reference to the attached drawing figures briefly described below and described in detail in the description of the preferred embodiments.

DETAILED DESCRIPTION OF THE PREFERRED EMBODIMENTS

Figure 1A:
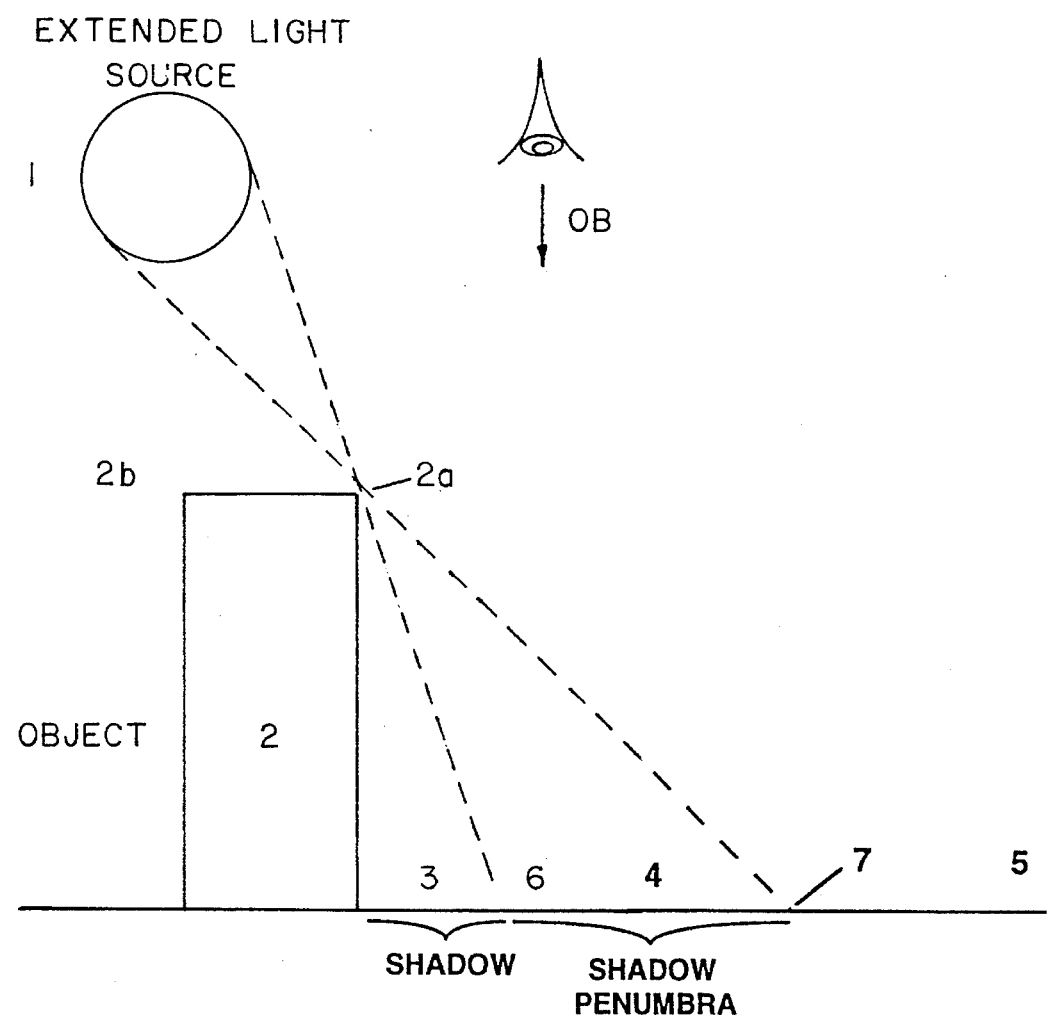
FIGS. 1a and 1b schematically illustrate the creation and illumination characteristics of a shadow cast by an extended light source and includes FIG. 1(a) which schematically illustrates the creation of the shadow and FIG. 1(b) which illustrates the intensity of the viewed scene.

The present invention has been developed from discoveries made by the inventor concerning the manner in which the human eye likely perceives shadows. In FIG. 1(a), an extended light source 1 illuminates an object 2. A shadow 3 is cast by a shadow casting object edge 2a. The light source 1, as are substantially all light sources to be encountered[1], is physically extended, having a finite width. The finite width of the extended light source 1 creates a shadow penumbra 4 in which the transition is made from shadow 3 to full illumination 5. Within this shadow penumbra 4 (often referred to as a "mach band"), some but not all of the extended light source 1 is shaded by the object 2. The shadow penumbra 4 linearly increases in intensity from a shadow transition 6 with shadow 3 to a higher intensity transition 7 with full illumination 5. A portion of the scene illuminated with full intensity outside the shadow penumbra 4 is designated as element 5 in FIG. 1(a).

[1] Starlight and laser light are exceptions as they may not be considered physically extended, they do not create a shadow penumbra.

Figure 1B:
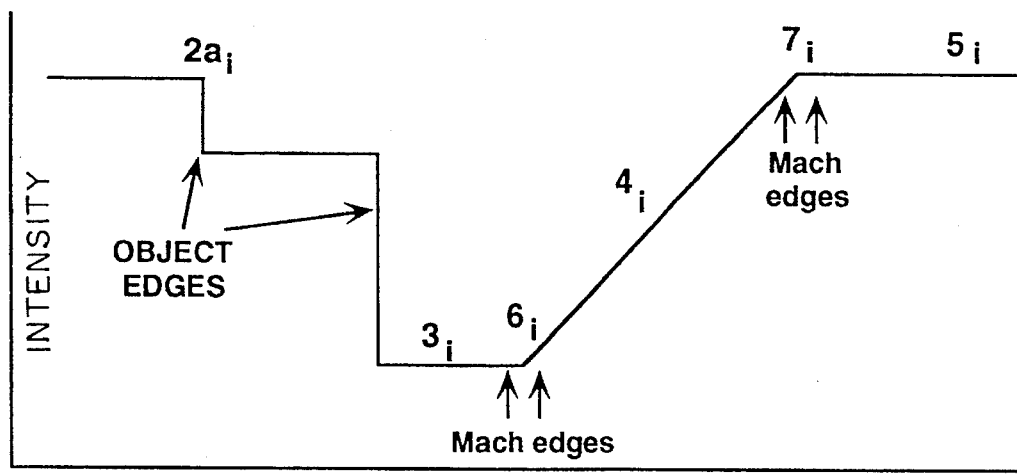

FIG. 1(b) illustrates the intensity of those features identified in FIG. 1(a) as illustrated by an observer OB. The features of the scene illustrated in FIG. 1(a) produce the intensity curve portions of FIG. 1(b) designated by the suffix "i". Accordingly, features 3–7 of FIG. 1(a) produce the intensity information curve portions designated by 3i–7i, respectively. As can be seen in FIG. 1(b) the shadow penumbra 4 has an intensity 4i which substantially linearly varies from the shadow intensity 3i to the fully illuminated scene intensity 5i. The shadow transition 6 between the shadow 3 and shadow penumbra 4 produces mach edges 6i. Similarly, the transition between full intensity portions of the scene 5 and the shadow penumbra 4 is illustrated by mach edges 7i. It should be understood that the width of the shadow penumbra 4 is defined by a geometry including the size (physical extension) of the light source 1, and the relative distances between the surface receiving the shadow penumbra 4, the object edge 2a, and the extended light source 1.

The shadow penumbra edges including the shadow transition 6 and higher intensity transition 7 are referred to as mach edges 6i, 7i. The intensity profile of such mach edges 6i, 7i is shown in FIG. 1(b). However, the image intensity is perceived by the human eye in the region of these transitions 6i, 7i alternate between bands of lighter and darker intensity thus is not illustrated in FIG. 1(b). While the human vision system perceives these intensity variations, giving rise to the term "mach bands", when the intensity values of these so-called mach bands are measured, the intensity does not vary in the manner perceived. The perception of mach bands is well-known and is regarded as an artifact associated with lateral inhibition of biological visual systems. Lateral inhibition is apparently a form of second derivative operation performed within the human vision system. The positions of mach bands occur roughly where the second derivative of the intensity profile is non-zero, the intensity transition points 6i, 7i of FIG. 1(b).

The ramp profiles of shadow penumbras are unlike the boundaries associated with most physical objects. Physical boundaries within the monitored scene produce intensity profiles such as the object edge 2ai. Such physical boundaries are normally quite abrupt, giving rise to reflectance differences between the object and background which do not depend on illumination conditions. For a system to effectively detect and remove shadows from a monitored scene, the possibility must be considered that a shadow developed by a first object edge may shadow a second object edge producing illumination differences across the boundary.

The presence of object edges such as 2a or 2b is sensed from reflectance differences across the boundary which are independent of lighting conditions. According to the teachings of the present invention, the difference between the intensity characteristics of abrupt object edges and ramp-like shadow boundaries is used in order to recognize the difference between these two types of edges and allow removal of undesired shadow information from the monitored scene.

One problem associated with distinguishing between abrupt object edges and ramp-like shadow boundaries in a machine vision system is that it is necessary to preserve the spatial configurations of the respective edges so that edge detection may be performed. In any machine vision system employing edge recognition techniques, internal and external originated noise must be controlled to allow unambiguous recognition of features. Such noise originates from a variety of sources including noise internal to the imaging array and processing system and physical texture of the objects within the scene being viewed.

Conventionally, in such a feature recognition system, noise was generally attenuated through a low-pass filtering of the image information to smooth the acquired image intensity signal. However, such a smoothing process rounds abrupt edges such as 2ai of FIG. 1(b) so that they exhibit a gradual intensity variation similar to that of the shadow penumbra 4i. Accordingly, in order to recognize shadows according to the teachings of the present application, it is highly desirable and likely necessary to remove noise without the blurring of the abrupt edges caused by such a low-pass filtering technique. Such a low-pass filtering technique removes the spatial information that is required to distinguish shadow penumbra boundaries from abrupt object boundaries.

Applicant has discovered that perception of mach bands or edges such as 6i, 7i of FIG. 1(b) is a goal of the human visual system. Accordingly, the method and system for detecting shadows through use of a video sensor according to the teaching of the present invention, models the human perception of such mach bands in the presence of high frequency spatial noise.

As mentioned above, it is hypothesized that the human eye and brain processing functions, the human vision system, distinguishes between abrupt object edges and ramp-like shadow boundaries. The edge detection model presented below and utilized in the method and system of the present invention simulates the contrast sensitivity of the human visual system to mach bands. The edge detection model described below successfully predicts the shape and magnitude of the contrast sensitivity curve of the human vision system and operates on the principal of optimal high-frequency alias suppression. High-frequency alias suppression is therefore utilized in accordance with the teachings of the present invention in place of low-pass filtering to remove undesired noise, producing shadow contrast sensitivities closely related to that of the human vision system.

It is therefore hypothesized that a form of alias suppression is utilized within human vision systems. The response of the operator described below is believed to be insensitive to high-frequency noise of the type that would result from nonuniformities in retinal/pixel response. The edge operator described below also responds strongly to relatively isolated abrupt contrast edges but is insensitive to high-frequency noise signals, causing the detector to respond weakly or not at all to patterns with closely spaced abrupt intensity edges of the type produced by high-frequency texture.

Other previously identified phenomena within the human visual system are also modeled by the edge operator described below. For example, it has been demonstrated that a low frequency Cornsweet edge can contribute to contrast perception. This contrast perception is degraded for high frequency Cornsweet edges which resemble a trio of closely adjacent edges. See Cornsweet, T. N., *Visual Perception*, New York, Academic Press, 1970. The edge operator utilized in accordance with the teachings of the present invention performs similarly.

The edge operator of the present invention makes use of the first and second difference values of the intensity information of the viewed scene to distinguish between object and mach edges. According to the teachings of the present invention, the edge operator is applied bi-directionally along each line of the viewed scene in which edge detection and shadow recognition is to be performed. The edge detection operations performed according to the teachings of the present invention utilize a plurality of pixel widths $\Delta$. In a preferred embodiment, integer pixel widths, for example, 2–8, are utilized to simplify design of the imaging system. However, it can be demonstrated that a continuously variable pixel width exhibits improved recognition and alias suppression. Accordingly, an alternative embodiment makes use of non-integer pixel widths as defined in equation (4) below. The use of non-integer pixel widths is believed to simulate the substantially continuously variable spacing of photoreceptor rods within the human eye. However, in the most easily implemented preferred embodiment of the machine vision system of the present application, integer multiples of an incremental pixel width $\Delta_o$ are utilized so as to simplify sensor design and video processing.

Prior to discussing the edge operator in detail, we will now briefly describe the structure of one embodiment of the present invention. In a preferred embodiment of the present invention, a video camera 20 supplies video information to a monitored scene such as that of FIG. 1 and supplies the monitor scene to a computer 22 having a video digitizing board contained therein to facilitate enhanced video processing. The computer 22 under control of a program as described herein processes the video information to remove shadows therefrom and to identify features. The computer thereafter utilizes the processed video image to aid in the control of a useful process. For example, when features are identified, the computer 22 may utilize the identified features to aid in the control of a robot arm 24 to manipulate one or more objects contained within the monitored scene, may set off an alarm 26 or the like for intrusion detection, or may provide information to a mechanical sorter to aid in the sorting of diverse objects. In other words, the features extracted from the video image, after removal of shadows, may be utilized in any known manner according to the teachings of the present invention, particularly in environments where control of the lighting environment is not possible or practical.

Figure 3A:
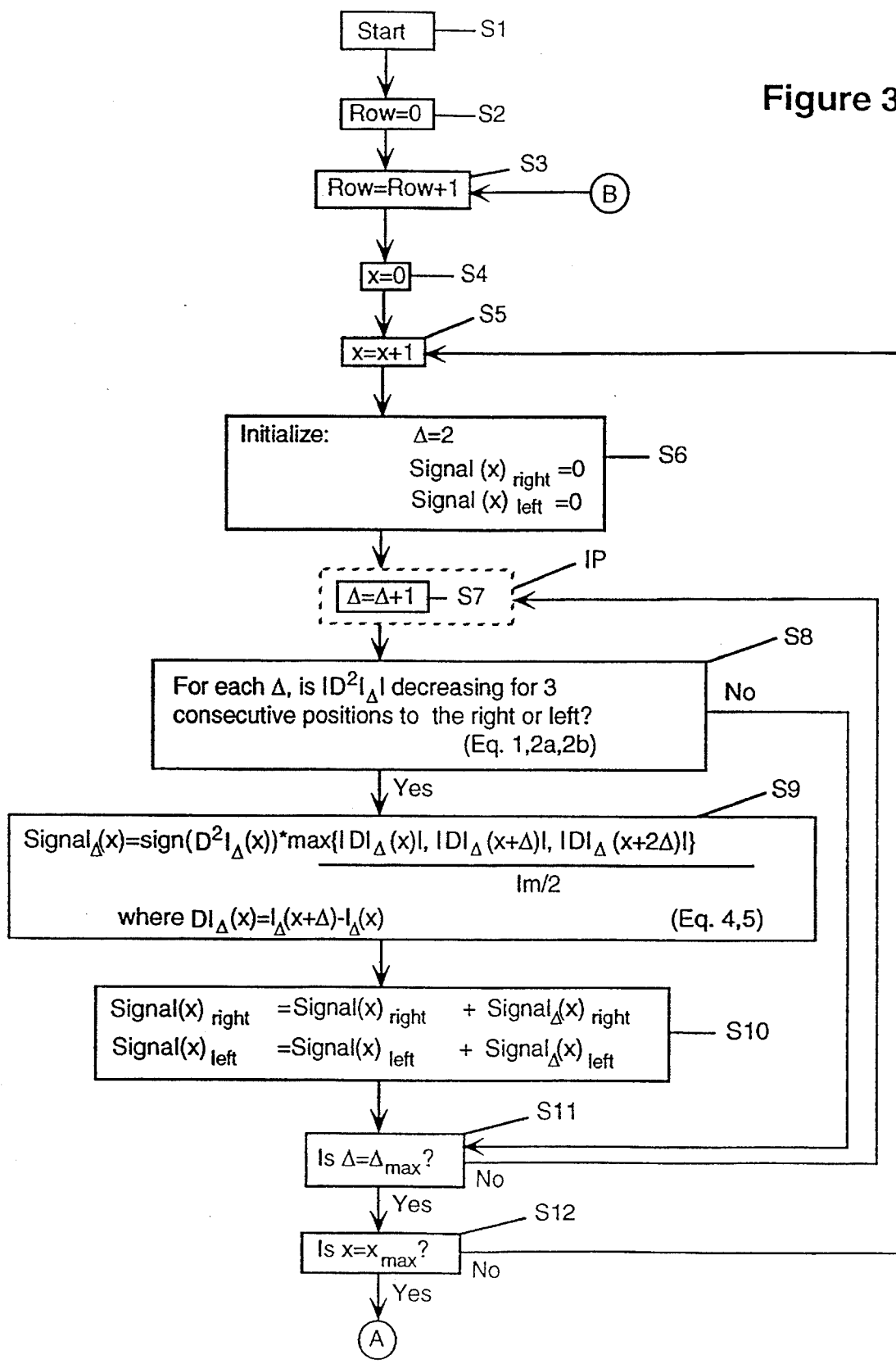
FIG. 3(a)–(b) describes a flow chart illustrating one embodiment of the program of the present application.
Figure 3B:
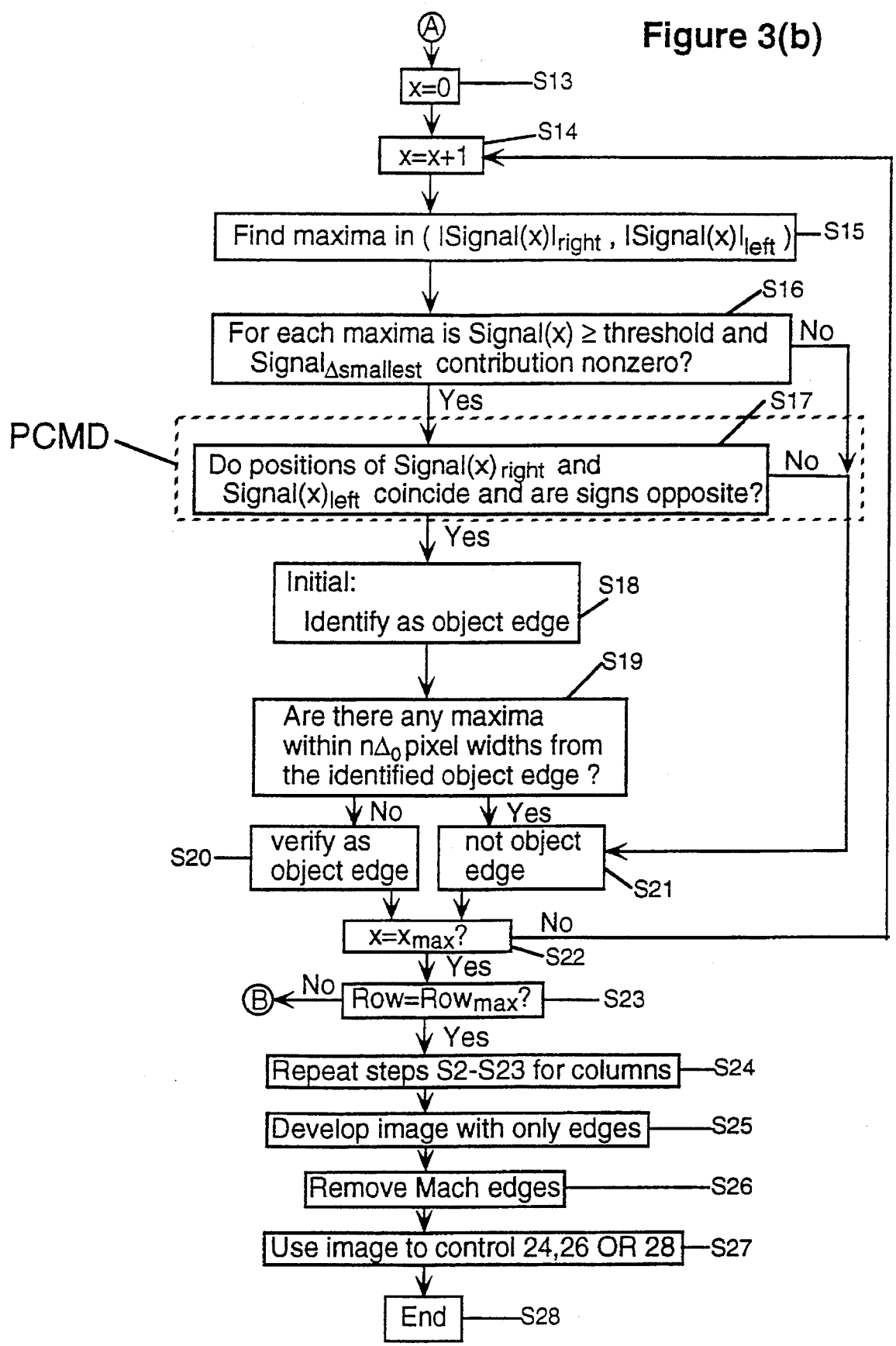

FIGS. 3a, 3b describe one embodiment of the program of the present application for distinguishing object edges from shadows in a monitored scene. Prior to describing the operation of the program of the present invention in detail, however, the edge operator of the present invention will first be described.

As described above, object edges may be distinguished from shadow edges due to the existence of the shadow penumbra 4 as illustrated in FIG. 1(*a*). As further previously described, this shadow penumbra includes a ramp-like intensity characteristic which can be identified by its associated mach edges. The vision system of the present invention utilizes first and second opposed edge detection signals which are produced by use of the first differential of image intensity taken in opposed directions across the image when the second difference of the intensity signal of such a shadow penumbra in opposed directions, the so called screening signals meet certain criteria. These first and second opposed edge detection signals exhibit opposite polarity maxima positioned at the shadow transition 6 and higher intensity transition 7 of the shadow penumbra 4. The function of the edge operator is to produce a second difference screening signal containing such maxima. The edge detection operation performs filtering through high frequency alias suppression to remove undesired noise from the image information without the need for low-pass filtering. The edge operators, for each discrete pixel width $\Delta$, are defined by:

$$D^2 I_\Delta(x) = I_\Delta(x) - 2 I_\Delta(x+\Delta) + I_\Delta(x+2\Delta) \quad (1)$$

The operation of equation (1) is performed at each image location x in each row of the monitored image in first and second opposed directions (right and left). The edge operators are utilized on each line of the scene in which shadow recognition is to be performed. Typically, the image will be fully processed with the edge operator both as to all rows of the image and later to all columns in a second processing pass to produce the above mentioned screening signals.

The directional second difference values $D^2_\Delta(x)$ for each of the right and left scans at each image location x are then examined for the following conditions:

$$|D^2 I_\Delta(x)| > |D^2 I_\Delta(x+\Delta/2)| > |D^2 I_\Delta(x+\Delta)| \quad (2)$$

and, $$\text{sign } (D^2 I_\Delta(x)) = \text{sign } (D^2 I_\Delta(x+\Delta/2)) \quad (3)$$

Figure 4:
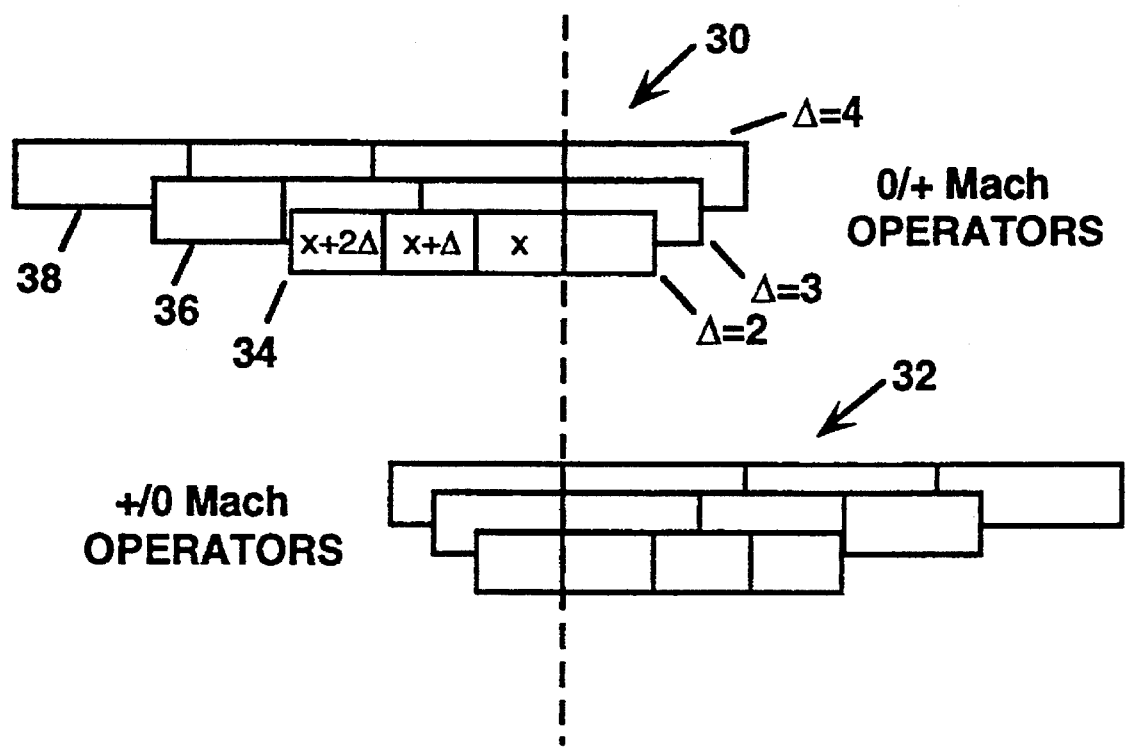
FIG. 4 is a schematic illustration of the overlapping sets of pixels used in the edge operator utilized in the program of the present application.

These are screening conditions used to suppress high frequency aliasing and ensure that only relevant first difference signals will be used in the detection of mach edges. This frequency aliasing suppression of the edge detection signal, developed from signal first differences, reduces undesired noise without degrading spatial information required for distinguishing penumbra transitions from abrupt transitions representative of object edges. The $I_\Delta(x)$ intensity values are averages over a width $\Delta$ and a height $\Delta_0$. The second difference operators model the effects of the receptive fields which produce lateral inhibition in the human vision system. As illustrated in FIG. 4, Equation (2) examines the intensity of a trio of adjacent pixels immediately preceding the pixel of interest in each scanning direction. Thus, Equation (2) is performed for each pixel from left to right and again from right to left. Stated simply, the screening conditions of Equations 1–3 perform aliasing suppression and inhibit the edge detection (first difference) signals where you don't want them to be.

The ideal model of human vision would utilize a continuous range of pixel widths corresponding to the continuous spacing of photoreceptive rods in the human eye. However, continuous variability of pixel widths is difficult in a machine vision system. Accordingly, in the present invention, this ideal case is approximated by a set of discrete pixel sizes. Choosing the number of pixel sizes for the model requires a trade-off between using the largest number possible to mimic a continuous range of pixels and using the smallest feasible number to keep the process computationally tractable. In one preferred embodiment, a discrete set of seven non-integer related values are used which are evenly spaced in log spatial frequency values. These pixel widths are:

$$\Delta = 2 \cdot \Delta_0 \cdot \beta^n, \text{ where } n=0, \ldots, 6 \quad (4)$$

In this preferred embodiment, a value $\beta=1.2546$ is used.

If the above screening conditions (Equations 1–3) are satisfied for a particular $\Delta$, then each total edge signal, signal $(x)_{right, left}$, is increased by the contribution of the edge detection signal:

$$\text{signal}_\Delta(x) = \text{sign}(D^2 I_\Delta(x)) \cdot \max \left\{ \begin{array}{l} |DI_\Delta(x)|, \\ |DI_\Delta(x+\Delta)|, \\ |DI_\Delta(x+2\Delta)| \end{array} \right\} / (I_m/2) \quad (5)$$

where $$DI_\Delta(x) = I_\Delta(x+\Delta) - I_\Delta(x) \quad (6)$$

and $I_m$ is the difference between the largest and smallest intensity values in the image intensity signal. The total edge signal, signal$(x)_{(right,left)\ total}$ is the sum of the signal$_\Delta$ (x) contribution for each of the set of $\Delta$ values, provided that the signal$_\Delta$ (x) contribution from the operator with the smallest pixel width is non-zero. In both the integer and non-integer the preferred embodiments, the smallest pixel width would be $2\Delta_0$. If the value of signal$(x)_{right,left}$ for the smallest pixel width $(2\Delta_0)$ is non-zero, the signal total is as calculated in equations 5, 6. However, if the value of signal(x) for the smallest pixel width is zero, the total edge signal(x) is set to zero. Two separate bi-directional total edge signals signal(x) are maintained and are referred to herein as signal$(x)_{left,right}$, or alternatively, signal$(x)_{first,second}$ with the right or second sum total edge signal, signal$(x)_{second}$ corresponding to using $\Delta$'s in Equation (4) with negative signs in equations 1–3, 5 and 6.

As illustrated in FIG. 4, the two sets of edge detection signals, signal$_\Delta(x)_{right,left}$ are represented as 0/+ mach operators 30 and +/0 mach operators 32, respectively and correspond to requiring that the second difference magnitudes decrease to the right (+/0, positive $\Delta$ values) or to the left (0/+, negative $\Delta$ values). The alignment of the 0/+ operators 30 and +/0 operators 32 with different pixel widths is illustrated in FIG. 4. Note that the 0/+ signal produced by the 0/+ mach operators 30 and the +/0 signal produced by the +/0 mach operators 32 are separately examined for edges along the pixel rows, with one edge assigned at the location of the largest value in each set of adjacent non-zero signal pixels with the same sign.

The left-to-right and right-to-left operations are performed by the +/0 mach operator 32 and 0/+ mach operator 30 as illustrated in FIG. 4 for each pixel width $\Delta$. The conditions of first difference edge detection signals and the second difference operators (screening signals) are examined for a number of different pixel width values. The purpose of using multiple widths is to ensure that the system will react to ramp-like shadow penumbra intensity curves 4*i* of widely varying slopes. Using multiple pixel widths further ensures that a legitimate ramp-like waveform exists, and not merely the averaging of values of a coarsely varying noise affected waveform which only coincidentally produces a decrease for three consecutive pixel positions.

Figure 5:
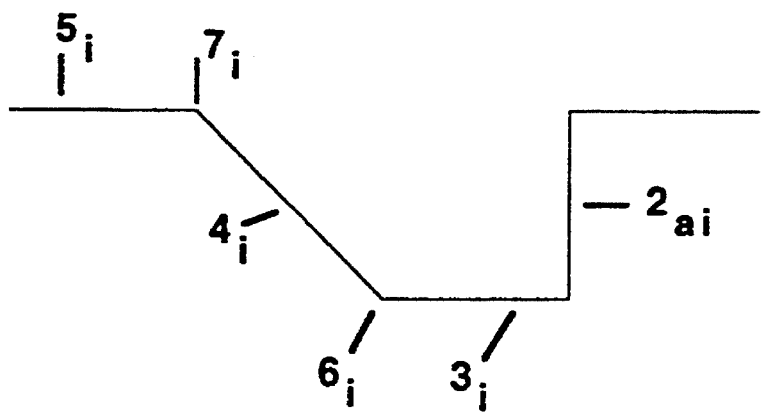
FIG. 5 illustrates the signal$(x)_{right,left}$ signals produced by the edge operators of equations 1–5 and their relationship to an intensity profile similar to that of FIG. 1(a).
Figure 5:
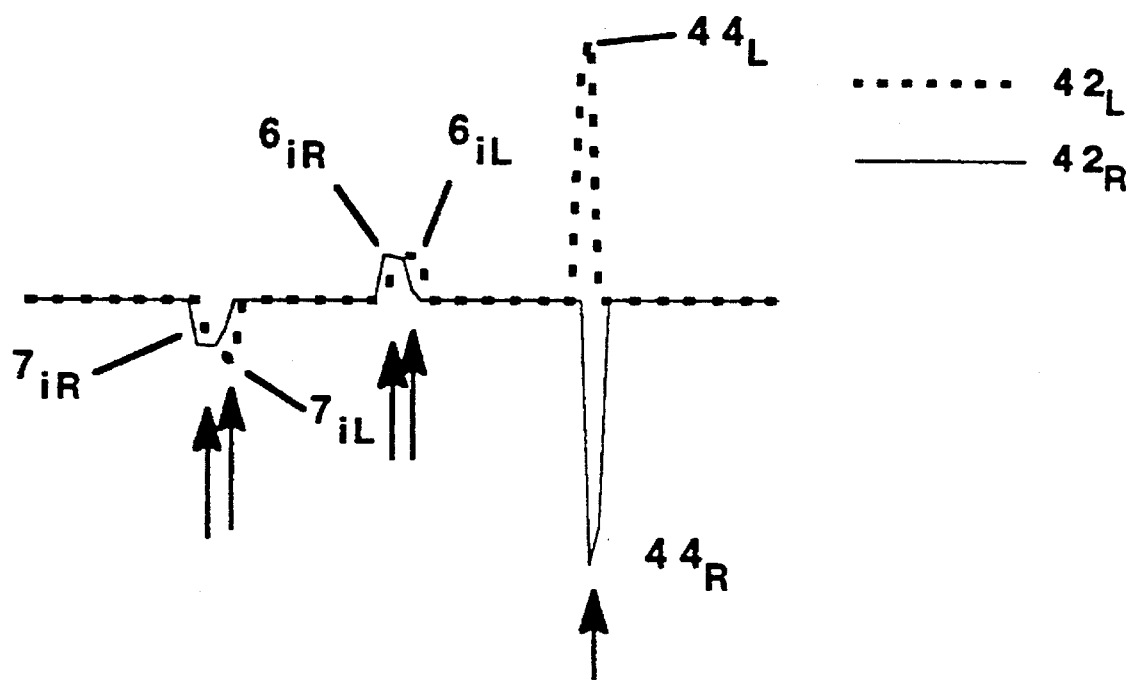

The use of difference signals in place of true derivatives actually produces an advantage as it makes abrupt edges more easy to distinguish from mach edges. Because the difference operation is not a true derivative, abrupt intensity drops such as 2*ai*, illustrated in FIG. 5 and indicative of an object edge, are more easy to distinguish from mach edges than would be the case if a true differential was performed. This is because, when the edge operator is examined from left to right 42R and then right to left 42L according to the teachings of the present invention, the right and left difference pulses 44R, 44L produced by the abrupt edge are of opposite polarity as opposed to the maxima 6iL, 6iR, 7iL, 7iR produced by mach edges which are of the same polarity for left and right scans of an image line.

In contrast, the true differential of an abrupt edge would produce closely coupled opposite polarity impulses in both right and left scans. This closely resembles the result which would be obtained if the shadow penumbra intensity 4i was steepened so that the shadow transition mach band 6i and higher intensity transition mach band 7i became closely coupled.

While one embodiment of the present invention contemplates non-integer pixel widths, the use of integer pixel widths $\Delta$ in the system of the present invention simplifies construction of a commercial video system with a standard imaging array. This integer video model of the present invention provides a reasonable qualitative imitation of the noise-insensitive human perception of mach and abrupt contrast edges without requiring image-dependent adjustments of edge signal thresholds. In the video system of the present invention, the cast shadow transitions and abrupt contrast transitions may be detected and distinguished even with use of integer pixel widths so that shadow edges can be removed from the image.

As explained above, FIG. 5 illustrates the right directional edge detection signal, signal$(x)_{right}$ 42R and the left directional edge detection signal, signal$(x)_{left}$ 42L and their relationship to an intensity profile containing an abrupt edge 2ai and a penumbra ramp 4i. The right directional edge detection signal, also known as the +/0 edge signal 42R and the left directional edge detection signal, also known as the 0/+ edge signal 42L, are shown at the bottom of this Figure. Arrows indicates positions of detected maxima occurring at either object or mach edges. The penumbra ramp 4i produces two closely-spaced pairs of maxima 6iR, 6iL and 7iR, 7iL, one pair straddling each end of the ramp. Note that each pair contains a maxima within both of the left and right directional edge detection signals 42L, 42R and a maxima pair is present both in the shadow transition edge 6i and higher intensity transition edge 7i of the shadow penumbra. Each peak pair contains left and right edge detection signal shadow transition maxima 6iL, 6iR and left and right edge detection signal higher intensity transition maxima 7iL, 7iR. Notice that the shadow transition maxima 6iL, 6iR are of the same polarity while the higher intensity transition maxima 7iL, 7iR are also the same polarity to each other. Also notice that the higher intensity transition maxima 7iL, 7iR are of an opposite polarity to the shadow transition maxima 6iL, 6iR. In contrast to the maxima produced by such a shadow penumbra signal, an abrupt contrast edge such as 2ai of FIG. 5 produces a coincident pair of left and right edge detection signal peaks having opposite signs. Since the two signal peaks occur at the same location, only one edge is detected.

Note that it is possible to think of the abrupt edge 2ai as a penumbra ramp 4i with the ramp width decreased to 0. From this, one might expect that an abrupt edge would produce two coincident maxima with opposite signs, as actually obtained, plus two more maxima on either side of the first maxima pair. Previous attempts to understand mach bands predicted exactly this result. However, humans cannot perceive mach bands at abrupt edges and thus the operators utilized in the present invention suppress the predicted outer maxima of such abrupt edges through the high-frequency aliasing suppression inherent in Equation (2), thereby modeling the performance of the human vision system.

As the penumbra width goes to 0, the inner maxima increase in amplitude while the outer maxima decrease, until the inner maxima merge and the outer maxima vanish. Thus, the model produces no calculated maxima representative of mach bands in abrupt contrast edges, in agreement with human perception. This simultaneously resolves the long-standing theoretical difficulty with lateral inhibition action on abrupt edges and provides a signature for distinguishing computed mach edges from computed abrupt contrast edges. This distinction follows from the qualitative difference between nearby mach bands (with non-overlapping −/− and +/+ edge peaks) and abrupt contrast edges (with overlapping −/+ edge peaks).

Figure 6:
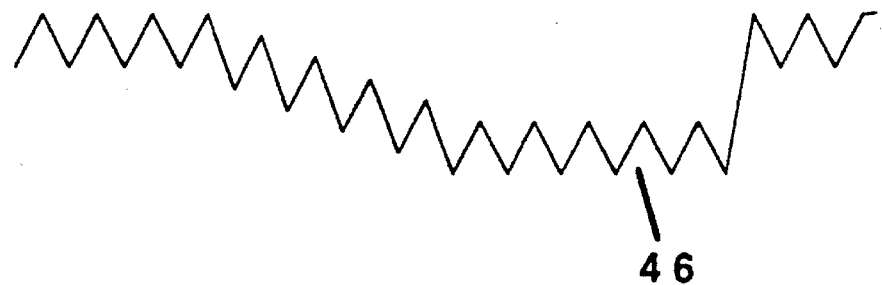
FIG. 6 illustrates the insensitivity of the signals signal$(x)_{right,left}$ to high frequency noise signals.
Figure 6:
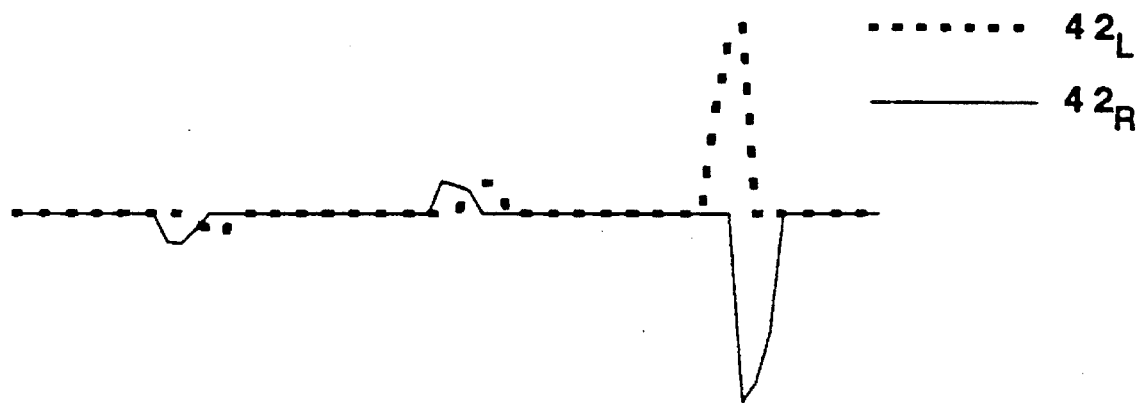
Figure 7:
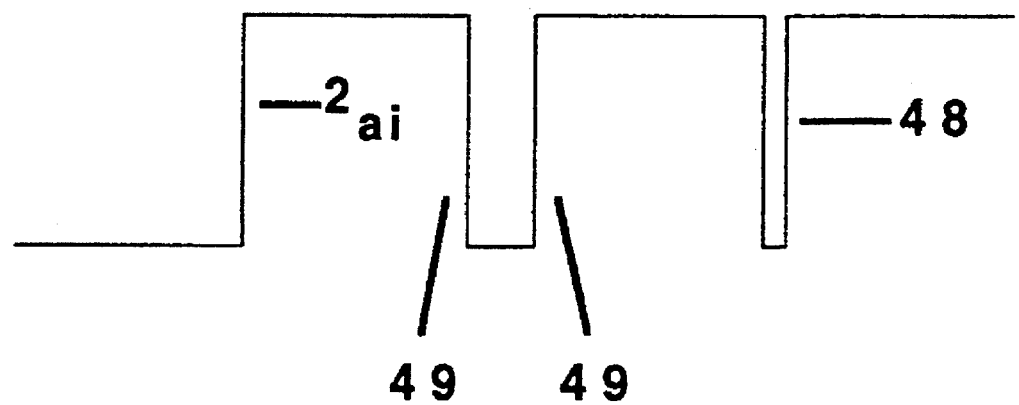
FIG. 7 illustrates the insensitivity of the edge operator and the signals signal$(X)_{right,left}$ to closely spaced edges.
Figure 7:
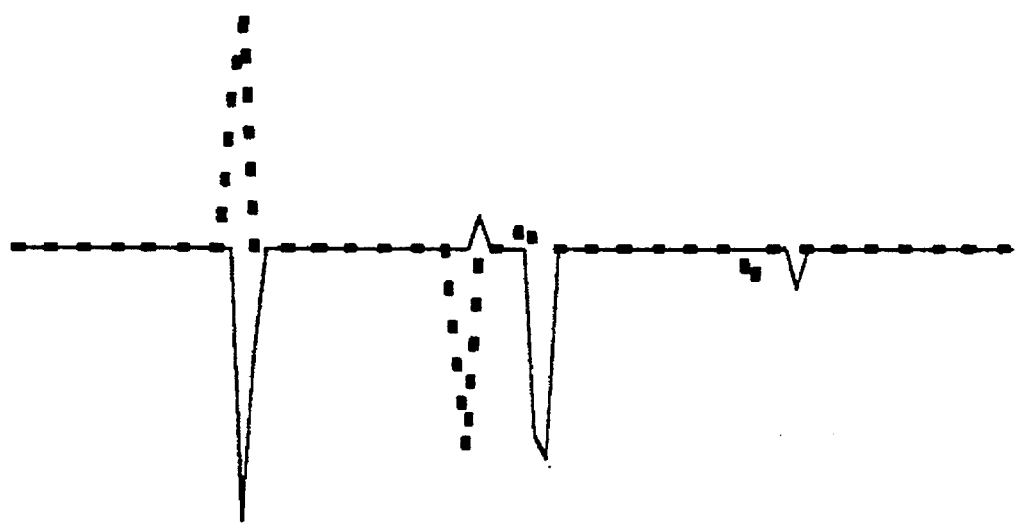

FIGS. 6 and 7 illustrate the suppression of high-spatial frequency noise inherent through use of the edge operators (second difference signals) of the present invention. As illustrated in FIGS. 6, where the intensity profile exhibits corruption of both an abrupt contrast edge and a shadow penumbra by high-frequency noise signals 46, there is little degradation in the computed edge signals at the bottom of the figure, the first differential edge detection signals screened by equations 1–3, which are qualitatively similar to those computed edge signals of the above-discussed FIG. 5. The high-frequency signals do not produce any maxima due to the requirements of Equation (2) discussed above where the second difference must be continuously increasing in the proximity of the pixel of interest to cause an effect on the edge detection signal.

FIG. 7 illustrates a series of abrupt edges with increasingly close spacing. In FIG. 7, the closely-spaced abrupt edges 48 are separated by a single pixel. The effects of Equation (2) strongly suppress the edge signals of this closely-spaced abrupt edge pair 48 due to the aliasing suppression effects. As the distance between neighboring abrupt edges increases, first one edge signals turns on and then both of the +/− pair edge signals become non-zero. This can be seen by the computed edge signals produced by the less closely spaced edge pair 49. The frequency dependence of the noise suppression action of Equation (2) is further discussed hereinbelow. It should be noted, however, that the high-frequency noise sensitivity occurs in the frequency range required to suppress the effects of non-uniformities in pixel response strengths.

Figure 8:
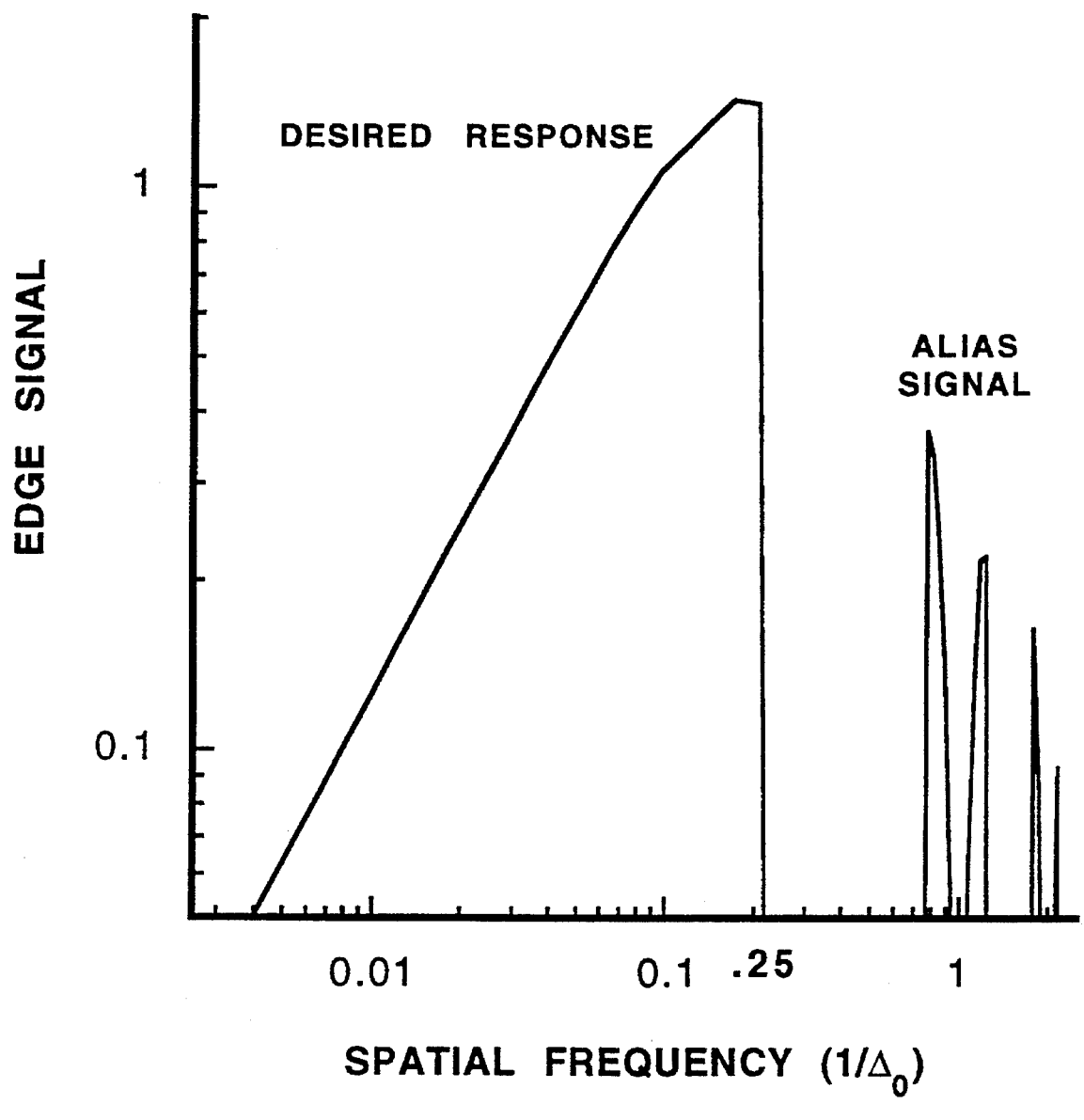
FIG. 8 illustrates the response of a single operator signal$_A(x)$ to a sine wave.

FIG. 8 shows the response of a single smallest width operator $\Delta$ to a sine wave. Assuming that a smallest pixel width $\Delta=2\Delta_0$ is utilized, then the system of the present invention provides good detection of signals having a frequency up to the cut-off $f=0.25/\Delta_0$. This figure demonstrates not only the cut-off mentioned above but also the relatively broad response of the operator to frequencies below the cut-off frequency. Note that additional response appears above $f=0.75/\Delta_0$. This is due to aliasing, since the periods of these sine waves are all less than the pixel width of the operator. It is necessary to suppress this high frequency aliasing signal.

At lower frequencies, the response of the single operator signal$_\Delta(x)$ of FIG. 8 decreases until it becomes, for practical purposes, unresolvable. For this reason, the system of the present invention utilizes multiple pixel widths $\Delta$. Each increase in pixel width produces an operator with increased low-frequency response although that operator's high-frequency response is degraded. It is therefore desirable to utilize plural operators, each effective within a different range of frequencies. There is a limit, however, to the number of operators which may be utilized. As shown in FIG. 8, the aliasing signals occur above $0.75/\Delta_0$. Since this is three times the frequency of the maximum signals of interest, and since each time the pixel width is increased, the entirety of the signal response of FIG. 8 correspondingly decreases in frequency, the maximum pixel width should be maintained to be less than or equal to three times the minimum pixel width. A greater ratio between maximum and minimum pixel widths would result in the desired signal response of one (the largest pixel width $\Delta$) operator overlapping the aliasing signal response of another (the smallest pixel width $\Delta$) operator.

An alternative embodiment of the present invention avoids this problem, however, in that the aliasing signals for each individual operator are suppressed individually prior to combination of the responses of the individual operators. See FIG. 3(f) and the description thereof. In such a circumstance, it is possible to increase the maximum pixel width/ minimum pixel width ratio to substantially more than 3.

In one aspect of the present invention, at step S16 of FIG. 3(b), a determination is made as to whether the signal$_{\Delta smallest}$(x)'s contribution is non-zero. This determination ensures that the aliasing signals of lower-frequency operators which approach the desired frequency range will not be detected as desired signals since such aliasing signals will not overlap the aliasing signal of the smallest width operator and thus will be discounted by this step of the algorithm. The determination of step S16, while not necessary, is desirable and allows a moderate overlap between the aliasing signals of the smallest operator and signal response of the larger operator without resorting to processing of the individual operator responses to otherwise inhibit aliasing as contemplated elsewhere in the present application.

Figure 9:
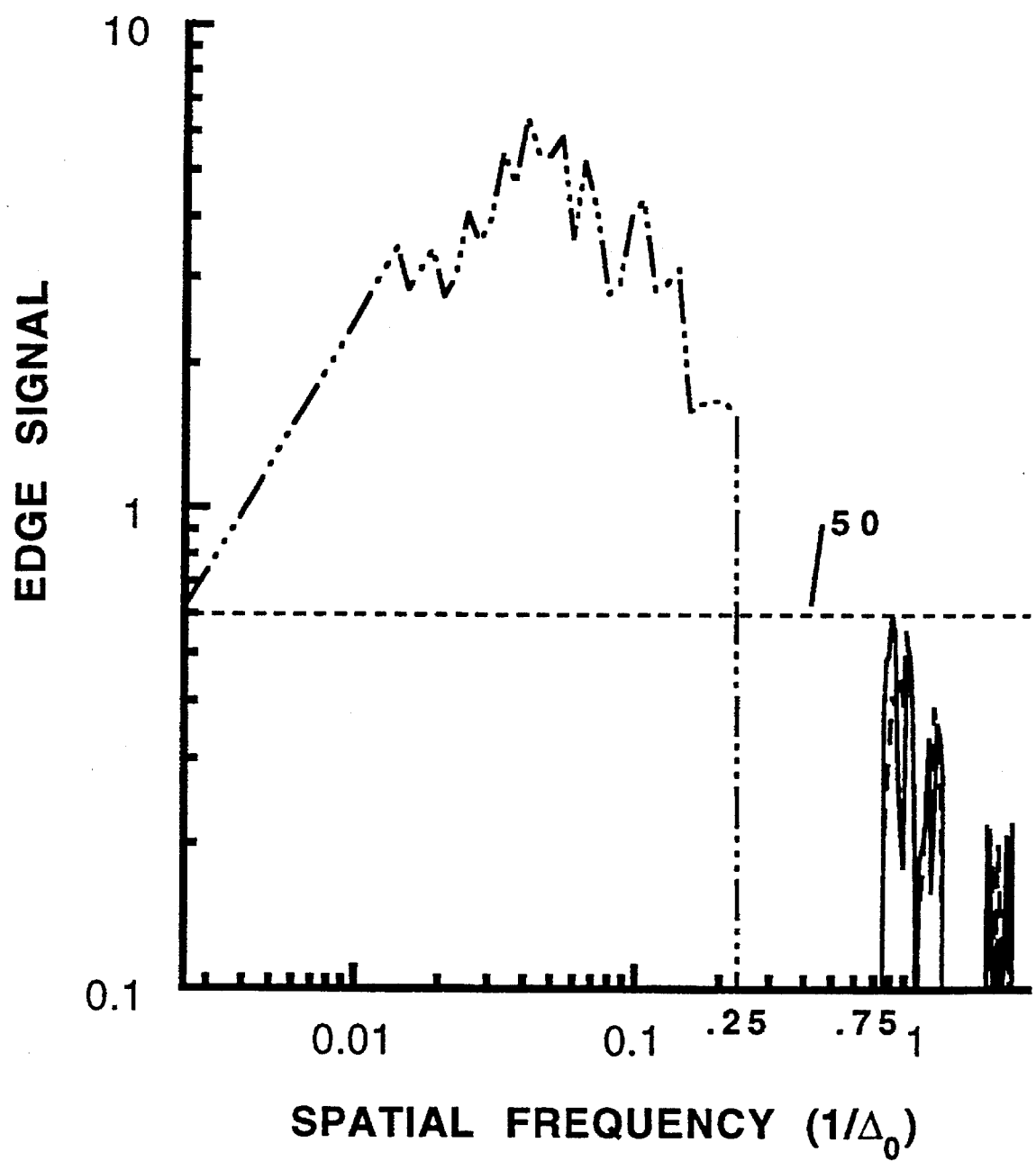
FIG. 9 illustrates the response of the human vision model, which utilizes the system of FIGS. 2–3 with the non-integer pixel widths specified by equation (3), to a trapezoidal wave.

FIG. 9 illustrates the response of the non-integer pixel width embodiment utilizing equation (4) to define $\Delta$. The non-integer pixel width embodiment may also be referred to as the human vision model as it simulates the operation of the human vision system. The response values in FIG. 9 are for a trapezoidal waveform. A key goal of a system according to the teachings of the present invention is to suppress system aliasing response without substantial loss of desirable signal. One way of suppressing aliasing response is to determine the presence of the signal only when it exceeds a signal threshold 50. This threshold 50 is selected to be at the maximum signal strength of the aliasing response of intensity patterns with the strongest, most abrupt, high frequency contrast edges. Thus signal strengths above this threshold must be due to low-frequency patterns. Note that this threshold need not be an adjustable parameter as it is determined entirely from the computed aliasing response to intensity patterns with the strongest aliasing signals. The signal values above this threshold serve as predictions of the magnitude of the mach edge sensitivity curve exhibited by human observers.

Figure 10:
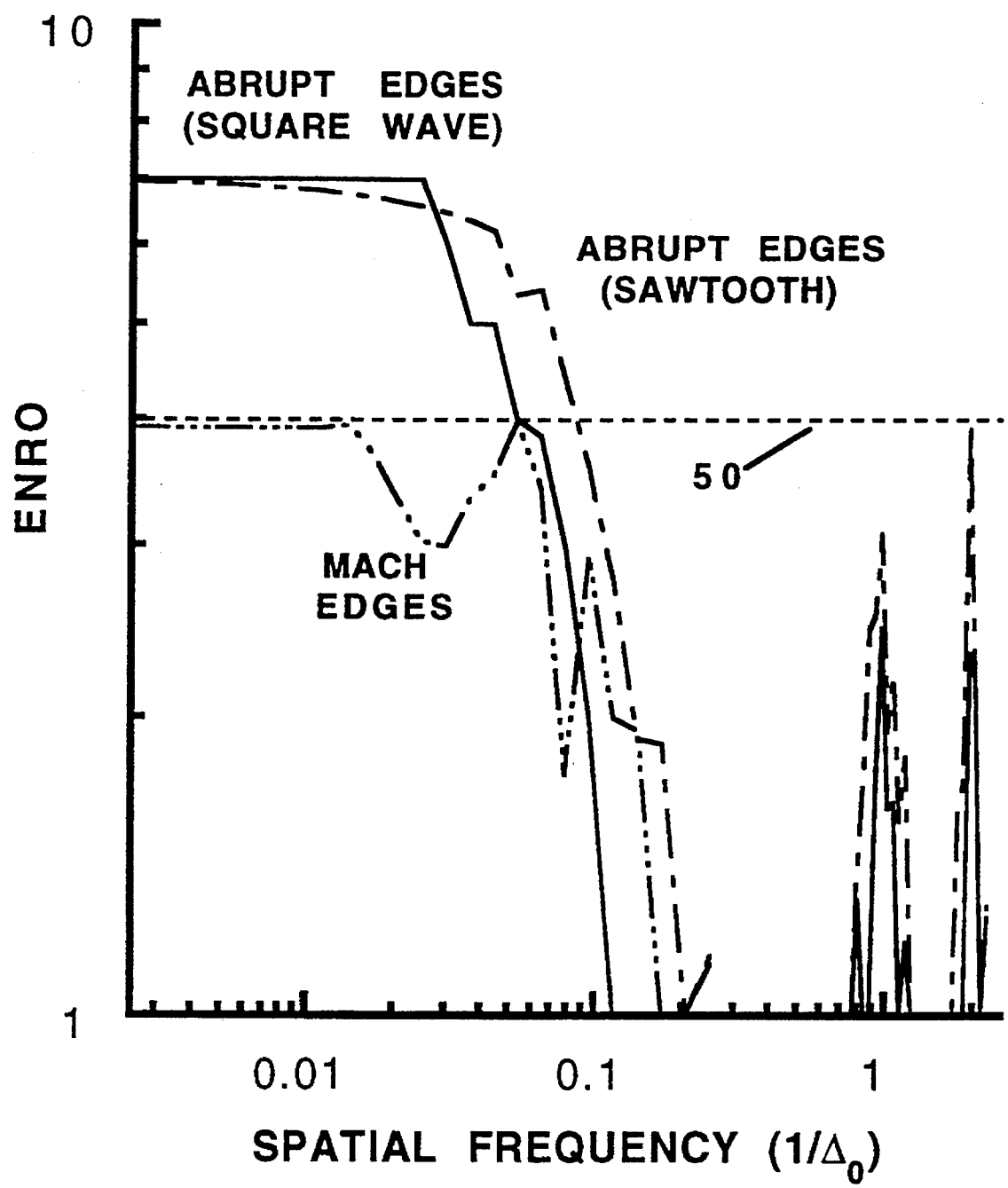
FIG. 10 illustrates the effective number of responding operators (ENRO) responding to various wave shapes in the human vision model used in FIG. 9.

FIG. 10 illustrates the relationship of a parameter known as the effective number of responding operators (ENRO) to various waveform configurations in the human vision model embodiment of the present invention employing continuously varying pixel width $\Delta$.

$$ENRO = \left( \sum_{\Delta_{min}}^{\Delta_{max}} Signal_\Delta(x) \right) / max\{Signal_\Delta(x)\} \quad (7)$$

where the summation and maximum are over all A values. FIG. 10 illustrates the response of the system of the present invention to square and saw-tooth wave patterns. The responding operators are each of the signal$_\Delta$(x) values which exceed a predetermined threshold as described in greater detail with respect to FIG. 3(d). Note that in this embodiment of FIG. 3(d), abrupt edges may be detected due to the number of responding operators. However, aliasing noise can produce a response in the same number of operators as would respond for a mach edge. By ensuring that the number of responding operators exceeds a threshold level set at the maximum number of responding operators for mach edges and for aliasing noise, low-frequency abrupt edge responses can be distinguished from all possible aliasing frequencies and for mach edges. An additional advantage of the noise filtering performed in accordance with the teachings of this embodiment of the present invention (the FIG. 3(d) embodiment) is that sensitivity of edge detection and contrast of the visual system is not degraded by, for example, low-pass filtering.

The above-discussed test results are for a system having non-integer pixel widths which responds more closely to the human visual system. However, the integer pixel preferred embodiment of the present invention, in order to make use of commercially available video imaging arrays, processes the data so as to provide pixel widths which are integer multiples of $\Delta_0$, the width of a single pixel in the video sensor's imaging array. In this integer pixel width preferred embodiment, these pixel widths are $2-8\Delta_0$ to produce seven responding operators. In Equation (2) as expressed above, the intermediate position, $x+\Delta/2$ in Equation (2) is generalized to be the truncated (rounded up) integer value for the +/0 (0/+) cases, respectively, when the pixel width $\Delta$ is an odd integer. In other words, when $\Delta$ is $7\Delta_0$, $\Delta/2$ is assumed to be $4\Delta_0$ for the 0/+ case.

Figure 2:
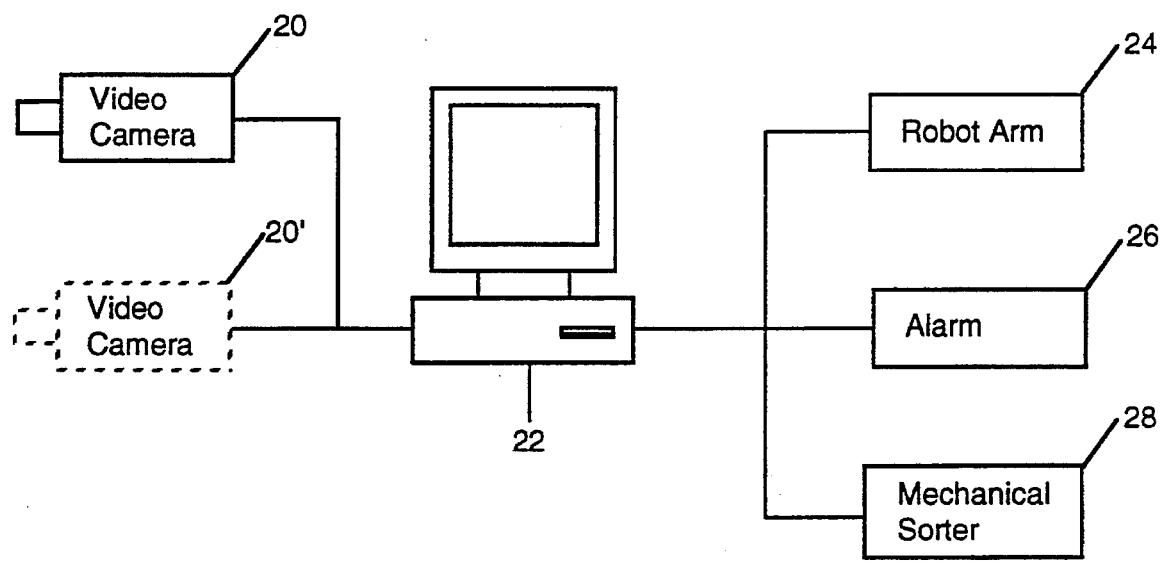
FIG. 2 schematically illustrates the hardware used in one embodiment of the system and method of the present invention.
Figure 11:
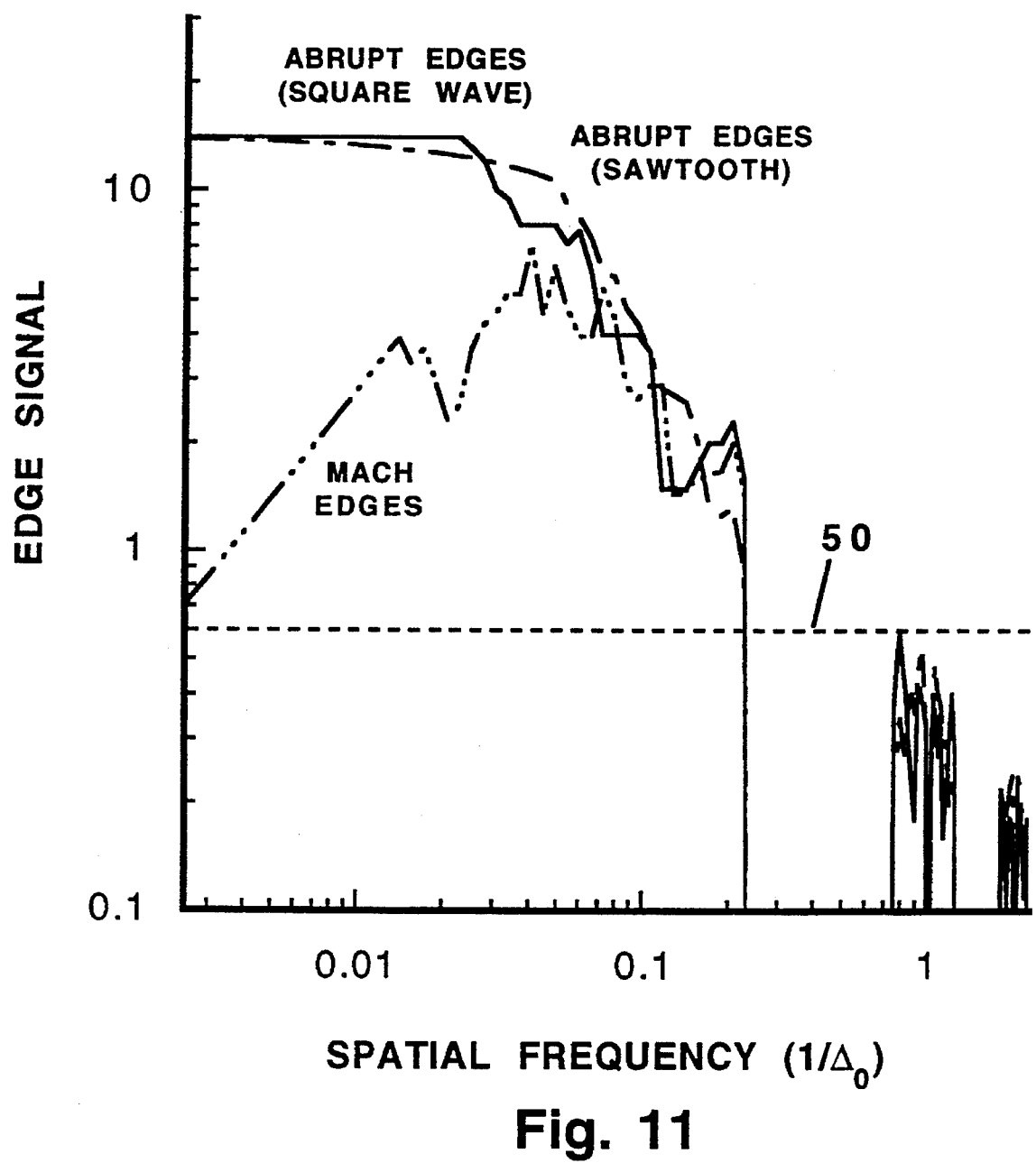
FIG. 11 illustrates the response of the integer pixel preferred embodiment to square and sawtooth abrupt edges and mach edges.

FIG. 11 illustrates the response of the integer pixel preferred embodiment of FIGS. 2 and 3 to mach edges and abrupt edges produced by square and saw-tooth waves. A comparison of the mach edge response of the integer pixel embodiment with the mach edge response of the non-integer pixel embodiment as shown in FIG. 9 illustrates similar performance. As in the non-integer embodiment whose performance is shown in FIG. 9, the integer embodiment uses a threshold 50 to provide alias suppression. Note, however, that the largest pixel width 8 give a maximum to minimum pixel width ratio of 8/2=4 which is slightly larger than the ratio of 3 as discussed previously. The practical result of this larger maximum to minimum pixel ration is that there will be a slight aliasing contribution to the largest operators which will not be suppressed by the mach signal threshold. This could be avoided by using a set of five pixel sizes excluding pixel widths of 7 and 8 $\Delta_0$. However, the use of step S16 of FIG. 3(b) ensures that the aliasing response of the longer pixel widths alone will not result in detection of an object edge. An alternative manner of suppressing this aliasing response would be to suppress the aliasing of each individual operator as in the embodiment of FIG. 3(f) otherwise described herein.

Figure 12:
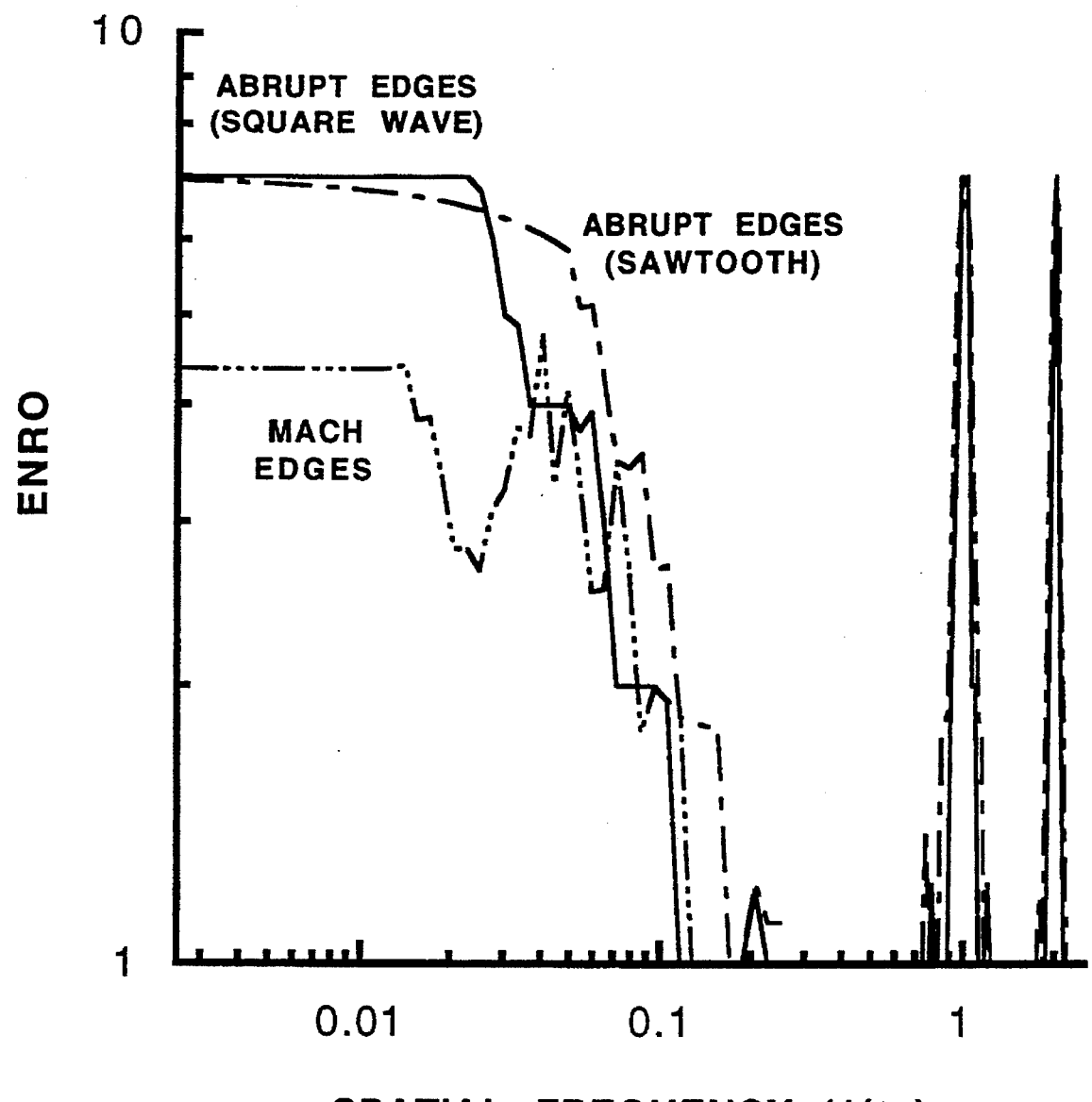
FIG. 12 illustrates the number of operators responding to abrupt and mach edges in the integer pixel preferred embodiment of the present invention.

FIG. 12 illustrates the ENRO response of the integer pixel preferred embodiment. In such an integer embodiment, thresholding of the completed signal is not possible. Thus, without removal of the high-frequency aliasing components of each operator as for example described in FIG. 3(f) and its corresponding portions of the specification, the number of responding operators method of distinguishing abrupt edges from mach edges cannot be utilized.

Figure 13:
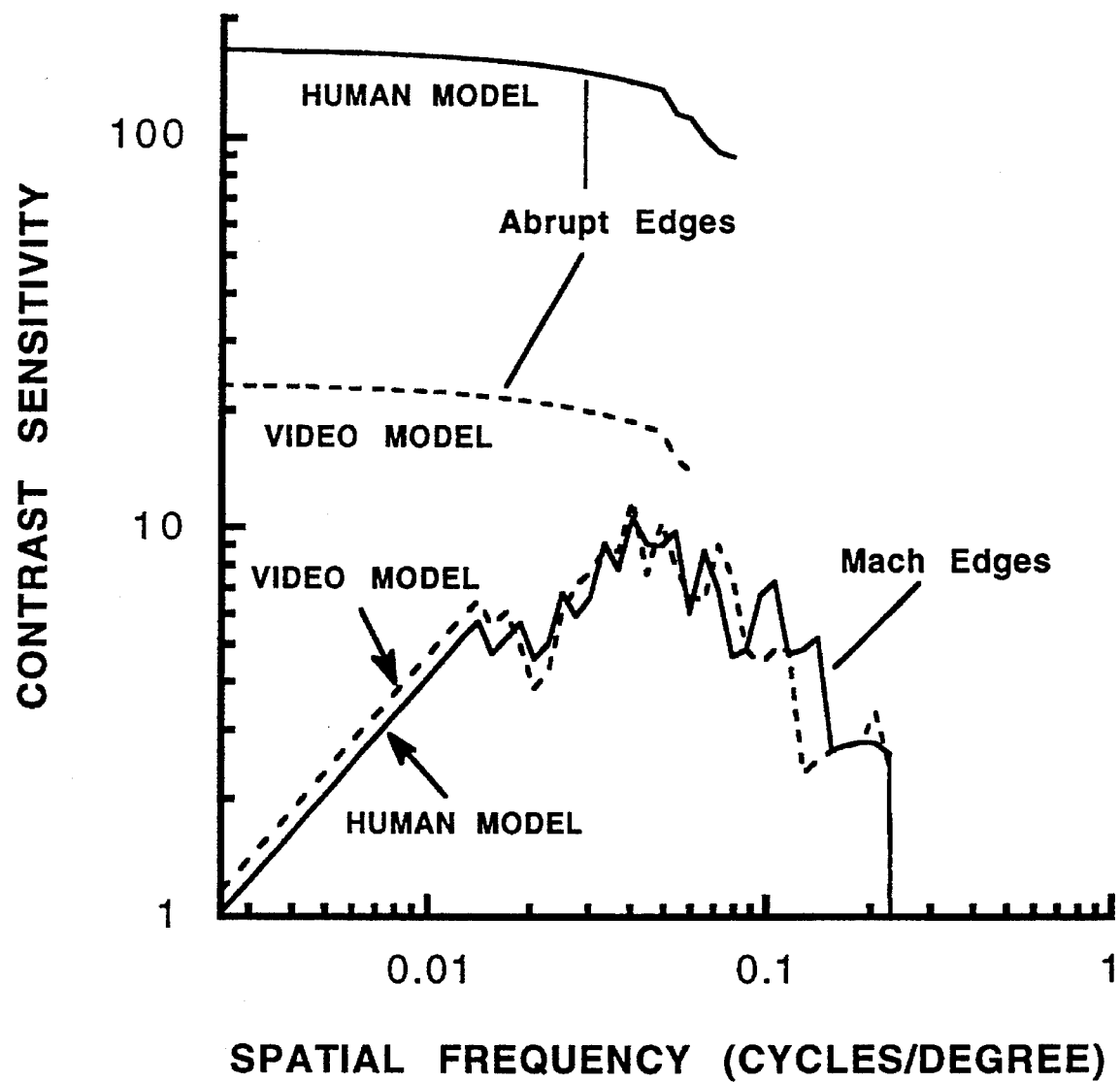
FIG. 13 illustrates a comparison of the shadow contrast sensitivity of the non-integer pixel width embodiment (also referred to as the human vision system model) which utilizes the system of FIGS. 2,3 with non-integer pixel widths specified by equation (3) to that of the integer pixel width embodiment of the present invention.
Figure 14:
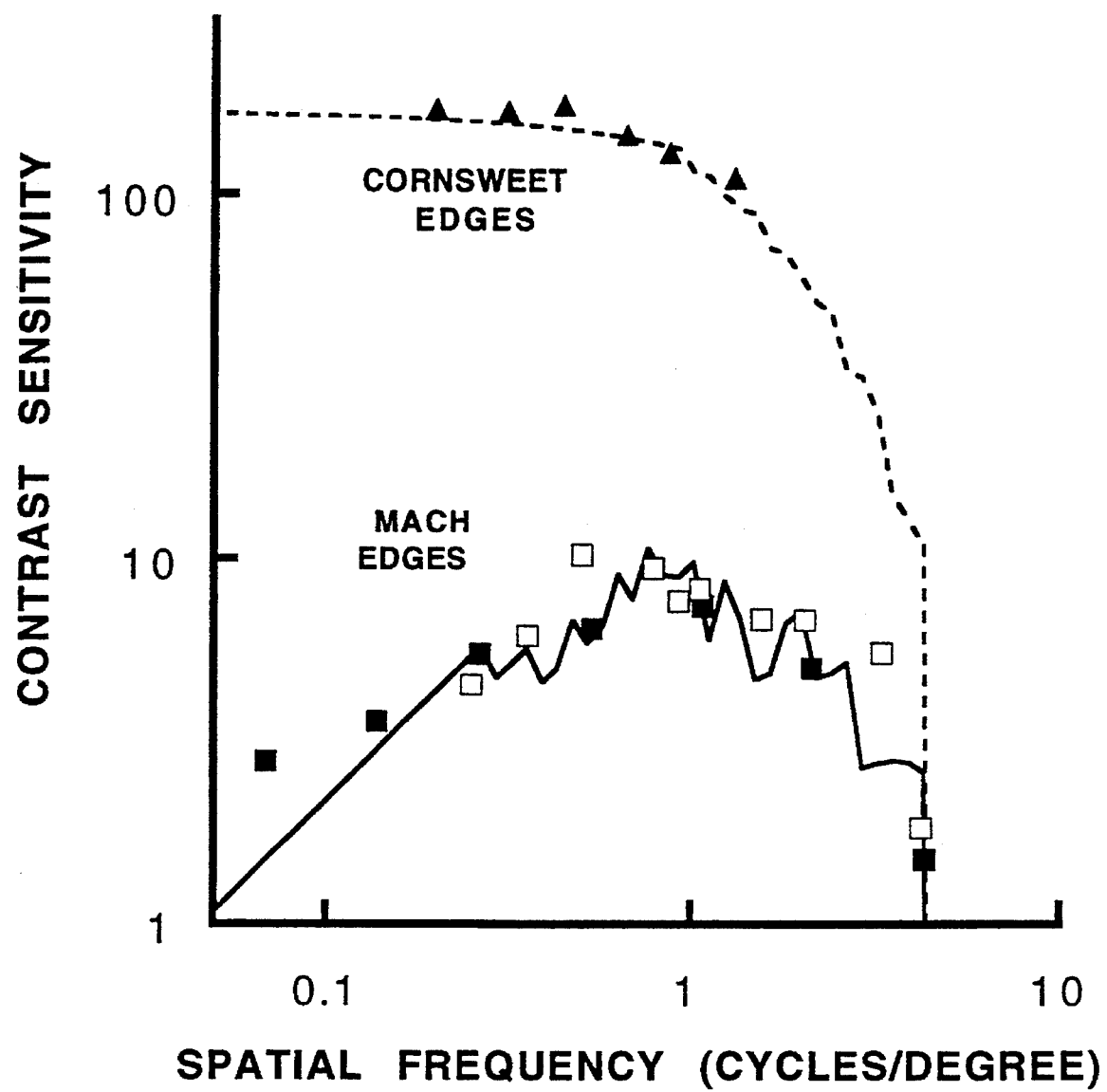
FIG. 14 compares the shadow contrast sensitivity of the non-integer pixel width embodiment to data taken from subjective human perception studies.

FIG. 13 compares measured data of the performance of the non-integer pixel width embodiment or human model with the integer pixel width video model discussed hereinabove. Note that the sensitivity to mach edges, the shadow contrast sensitivity, is substantially equivalent for the two models. In contrast, the integer pixel width model shows degraded abrupt edge sensitivity when compared to a non-integer pixel model. This non-integer pixel model width further closely correlates to the actual performance to the human vision system as will be seen in FIG. 14. It is accordingly apparent from FIG. 13, that the embodiments of the present invention exhibit similar shadow contrast sensitivity. The correlation of the shadow contrast sensitivity of the human vision system model (non-integer pixel embodiment) which utilizes the system of FIGS. 2, 3 with non-integer pixel width specified by the Equation (3), to the sensitivity of the human vision system is shown in FIG. 14. FIG. 14 compares experimental human judgment data for mach band perception to the measured model sensitivity of the model produced in accordance with teachings of the present invention. The solid line of FIG. 14 represents the mach band shadow contrast sensitivity and of the non-integer human vision system model produced in accordance with the present invention. The solid squares plot human judgment data obtained from "Mach Bands Are Phase Dependent" by Mottone, M. C., Ross, J., Burr, D. C., and Owens, R., published in Nature 324, pp. 250–253, 20 Nov. 1986. The open squares are human judgment data measurements taken from "High Frequency Limitations on Mach Bands" by Ross, J, Holt, JJ and Johnstone, J. R., published in Vis. Res. 21, pp. 1165–1167 (1981). The frequency values of the data from the Ross et al. publication were multiplied by 3 to align the sets of experimental data along the spatial frequency axis. From a comparison of this human judgment date to the non-integer pixel embodiment performance data it is apparent that the non-integer pixel embodiment simulates the shadow contrast sensitivity of the human vision system through analysis of the second difference signals produced from repetitive sums with multiple pixel widths. Further, it is apparent from FIG. 13 that the shadows contrast sensitivity of the integer pixel width embodiment is closely coupled to that of the non-integer width embodiment. Accordingly, it is apparent that both of these embodiments simulate the shadow contrast sensitivity of the human vision system.

FIGS. 3(a), 3(b) illustrate a flow chart utilized in one preferred embodiment of the present invention. The embodiment of FIGS. 3(a), 3(b) contemplates the use of integer multiple pixel widths to produce the video system results of the preferred embodiment. Upon start of the program of FIG. 3(a) in step S1, the row number is initialized to zero at step S2. Next, at step S3, the row number is incremented by one. Likewise, the position x within the row is initialized at step S4 and is incremented at step S5. At step S6, the directional edge detection signals, signal$(x)_{right}$ and signal$(x)_{left}$ are initialized to zero and the initial value of the pixel width $\Delta$ is set to two. At step S7, the pixel width $\Delta$ is incremented by one in the integer pixel width embodiment. The non-integer pixel width embodiment differs from the integer pixel width embodiment of the substitution of box NIP of FIG. 3(c) for box IP of FIG. 3(a). However, in both of the preferred embodiments, the narrowest pixel width utilized is twice the incremental pixel width $\Delta_0$.

The variation in pixel width $\Delta$ may be accomplished in the system of the present invention in a variety of fashions. In the preferred embodiment of the present invention, the video sensor includes a digitizing board which stores the monitored scene. In the integer pixel width embodiment of the present invention, the digitizing board has a resolution pixel width $\Delta_0$. Each of the pixel widths $\Delta$ utilized in the integer pixel width system of the present invention are an integer multiple of this incremental pixel width. Accordingly, the digital computer 22 of the present invention can perform the program of the present invention described herein, processing $n\Delta_0$ pixels of each line of the digitizing board as a single pixel of width $\Delta$ where $\Delta$ is equal to $n\Delta_0$. As the value $\Delta$ varies, the number of incremental pixels $\Delta_0$ combined when processing information from the video digitizing board is likewise varied under control of the program. Alternatively, the CCD array within the video camera 20, itself, also part of the video sensor, may be configured so that pixels of an incremental pixel width $\Delta_0$ may be combined as they are read out from the imaging array of the video camera, thereby performing this same function within the imaging array. Alternatively as described hereinbelow with regard to the non-integer pixel width embodiment of the present invention, camera distance from the object, or lens magnification may be varied to perform this same objective. Alternatively, multiple cameras can be used. The primary consideration, however, according to the teachings of the present invention, it that the processed pixel width $\Delta$ be capable of variation within the system according to the teachings of the present invention. Any appropriate means for performing this function may be utilized within the contemplation of the present invention.

Accordingly, at step S8, for the narrowest pixel width $\Delta=2\Delta_0$, the absolute value of the second difference of image intensity for each location x within the row is calculated. It is further determined whether this value $|D^2I_\Delta(x)|$ is decreasing for three (3) consecutive positions to the right in the case of signal$(x)_{right}$ and to the left in case of signal$(x)_{left}$. Thus, in essence, step S8 performs Equations (1), (2), and (3) as described above, performing higher frequency aliasing suppression and performing the previously mentioned screening functions.

If the criteria established in step S8 are satisfied for position x to the right or left, then the associated signal, signal$_\Delta(x)_{right}$ or signal$_\Delta(x)_{left}$ is assigned the value defined in step S9 as determined by Equations 5 and 6. The resultant signals signal$_\Delta(x)_{right,left}$ are added to signal$_\Delta(x)_{right}$ signal$(x)_{left}$, respectively in step S10 to develop first and second total directional edge detection signals. If the pixel width $\Delta$ utilized in steps S8 and S9 is not the maximum pixel width as determined in step S11, then steps S8 and S9 are repeated with an incremented pixel width from step S7.

Once the pixel width $\Delta$ is determined to be the maximum in step S11, then step S12 determines whether all values x have been processed for a given row. If the answer is no, then steps S5–S11 are repeated. Once the processing of signal$(x)_{left}$, signal$(x)_{right}$ has been completed, these total edge detection signals will resemble the computed edge signals 42R, 42L of FIGS. 5–7 of the present application. Once these computed total edge detection signals, signal$(x)_{right,left}$ are completed, the method of the present invention may then proceed to determine whether abrupt edges or mach edges are present in the image row.

Accordingly, the program of the present invention proceeds to step S13 in FIG. 3(b) wherein the position x within the row is again initialized to zero in step S13, and is incremented by one in step S14. Step S15 then determines whether a maxima exists at position x in signal$(x)_{right}$ or signal$(x)_{left}$. In step S16, a determination is made as to whether a detected maxima exceeds the signal threshold 50 below which aliasing can occur. This threshold suppresses aliasing noise and is set above the maximum value of such aliasing noise. This threshold can be determined by experimentation or calculation and need not be varied once set. Step S16 further determines whether the signal$_{\Delta smallest}(x)$ contribution to the total edge detection signal, signal$(x)_{right}$ or signal$(x)_{left}$ is non-zero? In other words, in the embodiment of FIGS. 3(a)–3(b), is the signal$_{2\Delta_0}$(x) contribution non-zero? This determination is made in order to assure that the aliasing responses of the larger width pixel operators do not alone cause a maxima in the total edge detection signal, signal(x)$_{right}$ or signal(x)$_{left}$. Unless there is also a contribution for the smallest pixel width operators, ensuring that the maxima is not merely due to aliasing in the larger pixel dimension operators, the maxima will not be considered as such to determine if an object edge exists.

Assuming that the criteria set forth in step S16 are met, then step S17 determines whether the positions of signal(x)$_{right}$ and signal(x)$_{left}$ maxima substantially coincide and have opposite signs. Substantial coincidence as contemplated by step S17 should be selected as experimental results dictated. It is contemplated that this coincidence of maxima position will be within one or two pixels. Assuming the criteria of step S17 are met, then an object edge is identified as existing at position x within the row at step 18.

Steps S19 and S20 describe an optional additional test to further verify the presence of an object edge. In step S19, a determination is made as to whether there are any other maxima with an $n\Delta_0$ pixel width from the identified object edge. The presence of these other closely adjacent maxima suggest that the edge detected may nevertheless be a mach edge. Accordingly, if maxima exists with an $n\Delta_0$ pixel width from the identified object edge, then it is determined to be a mach edge in step S21. Otherwise, the edge is verified as an object edge in step S20. The value n as utilized in step S19 is contemplated to be 2 or less. However, experimental results can be used to adjust the value of n to optimize overall accuracy.

At step S22, if x is not equal to $x_{max}$, then steps S14–S21 are repeated. Otherwise, the rows are all completed and the presence of object edges within each row of the image have been determined. If all rows have been processed in accordance with the methodology described above and recited in FIGS. 3(a)–(b) then the flow chart proceeds to step S24 wherein steps S2–S23 may be repeated for each of the columns of the image thereby providing two dimensional verification of object edges.

After the object edges and mach edges are recognized according to the teachings of the present invention, step S25 may develop an image with only the edges represented. Subsequently, the mach edges may be removed in step S26 to produce an image showing only object edges. In step S27 this image may be used in any useful manner, for example, to control any desired system such as the robotic arm 24, alarm 26, or mechanical sorter 28 of FIG. 2.

Figure 3C:
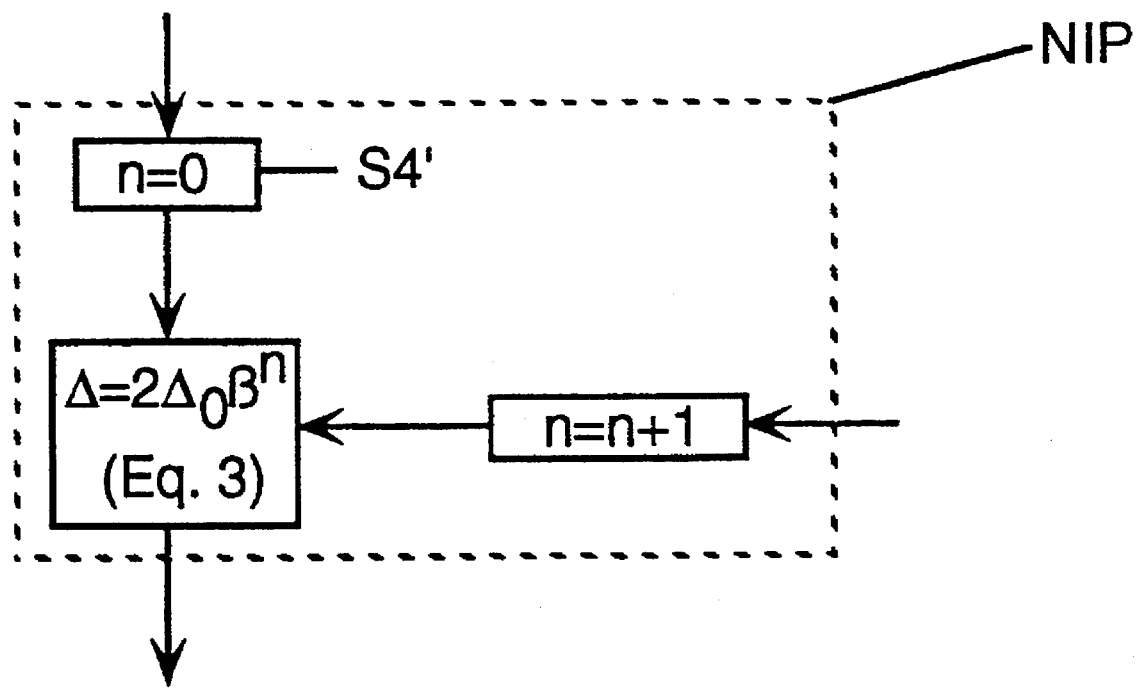
FIG. 3(c) is an alternative portion of the steps for defining the pixel width Δ for the non-integer pixel embodiment of the present invention.

In the human non-integer pixel width embodiment of the present invention, the portion of the flow chart of FIG. 3(a) identified by "IP" in this integer/pixel embodiment is replaced by the steps illustrated in FIG. 3(c) within the box "NIP" which varies the pixel width in a non-integer (log) fashion. This varying of the pixel width in a non-integer fashion may be performed, for example, by utilizing a custom CCD array in which pixel widths are tailored to the sizes which correspond to the requirements of Equation (3). Alternatively, the modified flow chart of FIG. 3 including the non-integer pixel NIP portion of FIG. 3(c) may be utilized in a system which employs more than one video camera such as video camera 20 of FIG. 2 and video camera 20' shown in phantom lines in FIG. 2. When two cameras are utilized, the images of the two camera are arranged to have different sizes by placing one camera closer to the scene than the other or by utilizing differing lens magnifications or zoom lenses. The images of the two cameras produce two different sets of pixel widths which are configured so as to not be integral multiples of each other. Accordingly, non-integer multiple pixel widths such as that shown in FIG. 3(c) may be accomplished to allow use of the effective number of responding operators (ENRO) as a factor for discrimination between abrupt and mach edges.

As an alternative, should it be unnecessary to examine the image substantially in real time, a single video camera 20 may be utilized to obtain differing pixel widths and the camera lens may be zoomed for repetitive scans so as to produce effectively differing pixel sizes. In such as case, the camera hardware, under control of the computer and its associated software as illustrated in FIG. 3(a) varies the size of the imaging pixels as performed in step S7 of FIG. 3(a).

Figure 3D:
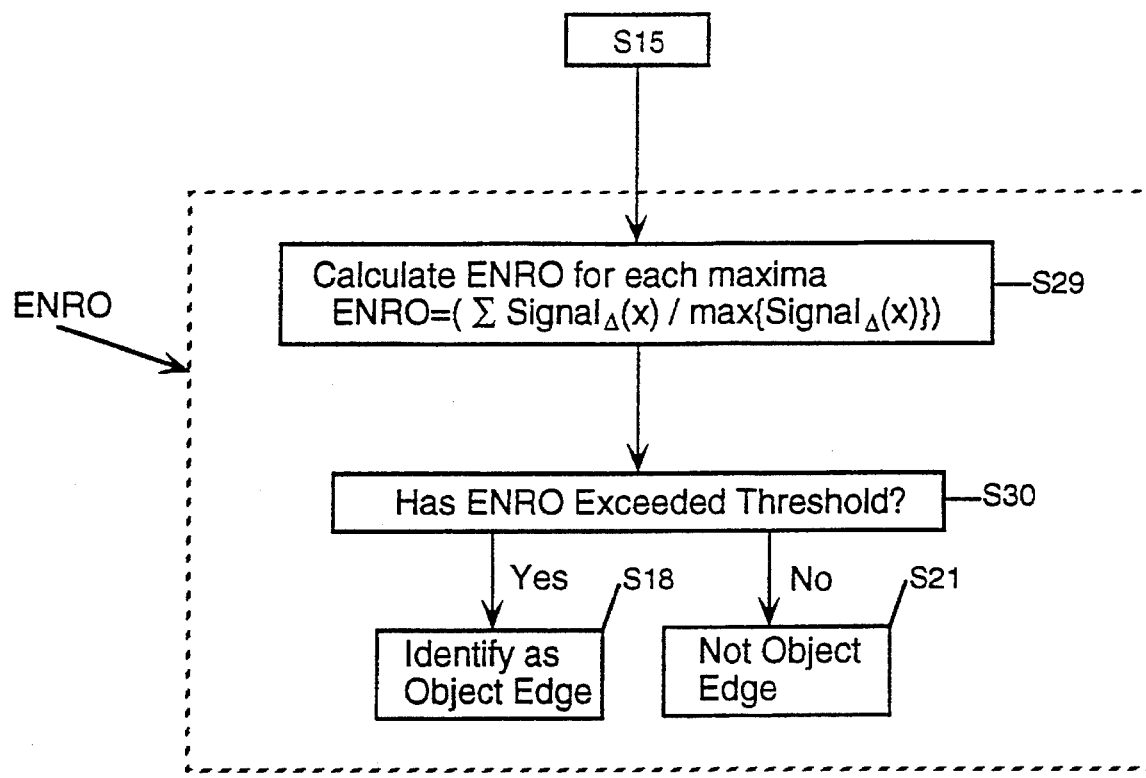
FIG. 3(d) is an alternative portion of the flow chart of FIGS. 3(a)–3(b) which uses ENRO to distinguish between mach edges and abrupt image edges.

FIG. 3(d), illustrates an alternative method of detection of abrupt edges in distinction from mach edges which is particularly useful in the non-integer pixel embodiment utilizing the flow chart portion of FIG. 3(c). The portion of the flow chart illustrated in FIG. 3(d) utilizes the effective number of responding operators (ENRO) to determine the presence of object edges. Thus, the subroutine portion ENRO of this figure replaces the positionally coincident maxima detection (PCMD) portion of FIG. 3(b), step S17. In the flow chart portion of FIG. 3(b) the ENRO is calculated for each maxima in step S29 as already generally described. If the calculated ENRO exceeds a threshold in step S30, then an object edge is identified at that position. Otherwise, no object edge is determined. This modification of FIG. 3(b) may be further used with the verification step, S19 if desired.

Figure 3E:
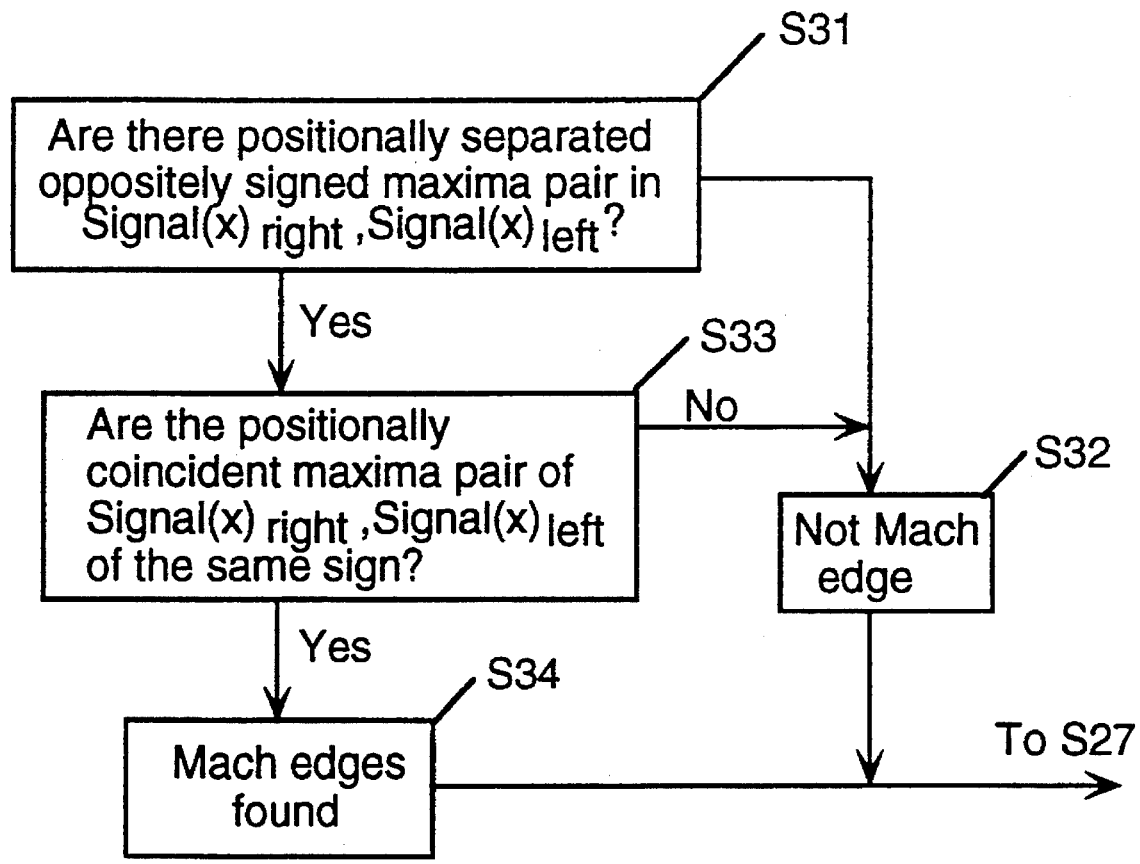
FIG. 3(e) is an alternative portion of the flow charts of FIG. 3(a),3(b) where mach edges are detected directly.

FIG. 3(e), illustrates an alternative embodiment which detects the presence of mach edges rather than the presence of object edges. The FIG. 3(e) embodiment replaces steps S17–S21 of FIG. 3(b) with an object edge detection (OED) portion including steps S31–S34. In FIG. 3(e), step S16' determines whether there are positionally separated oppositely signed maxima pair in signal(x)$_{right}$ and signal(x)$_{left}$? If this criteria is met, then step S33 determines whether the maxima pair are positionally coincident and are of the same sign. If this additional criteria is also met, then step S34 determines the presence of a mach edge. Otherwise, it is determined that no mach edge is present in step S32.

Figure 3F:
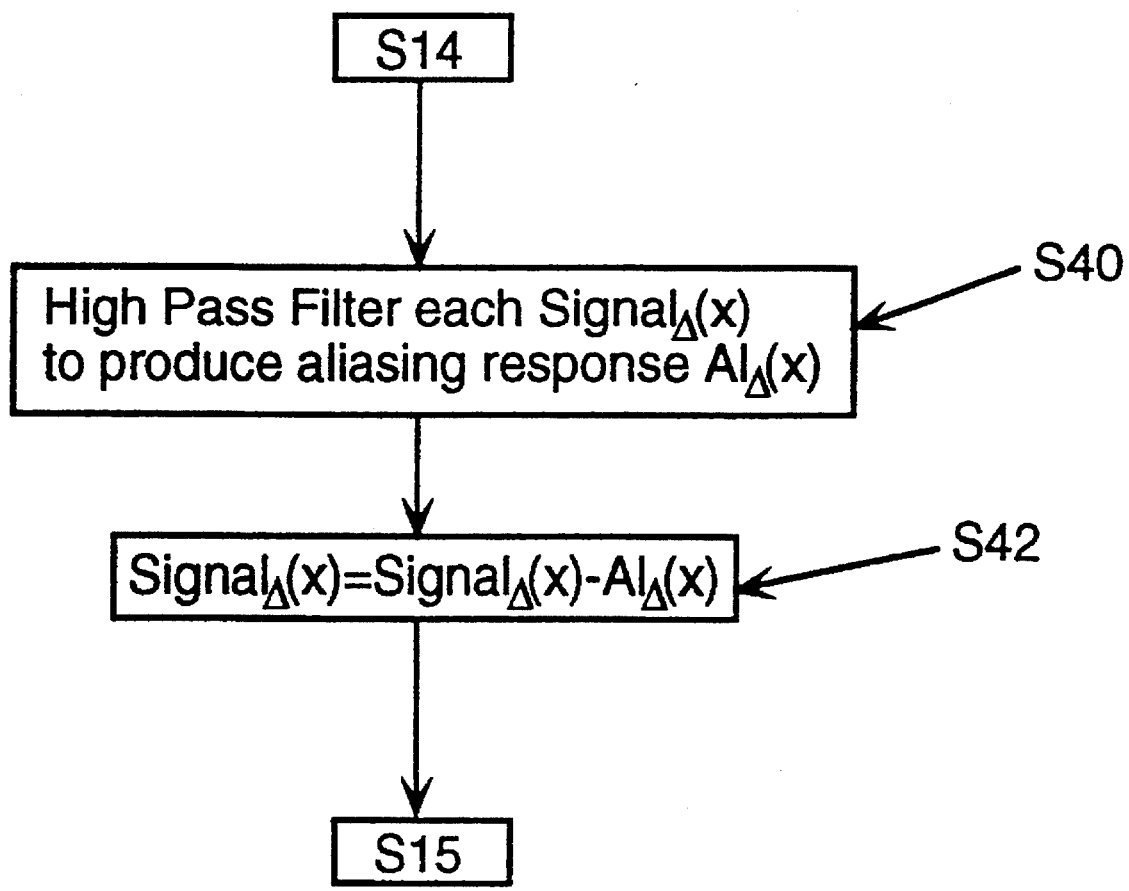
FIG. 3(f) illustrates an enhancement to the FIG. 3(a),(b) flowchart which allows the alternative embodiment of FIG. 3(d) to be used with integer multiple pixel widths.

The FIG. 3(d) embodiment of the present application, cannot be utilized with the integer pixel preferred embodiment of the present invention without further processing of each operator, signal$_A$(x). In order to use the FIG. 3(d) detection with an integer pixel width embodiment, it is necessary to, according to this alternative embodiment, as illustrated in FIG. 3(f), add two additional steps between steps S14 and S15 in FIG. 3(b). These steps include the step of high-pass filtering each signal$_A$(x) to produce the aliasing response Al$_A$(x) in step S40 and subtracting this aliasing response from each signal$_A$(x) in step S42 to attenuate the aliasing response of each operator. This allows an integer pixel width system to utilize a effective number of responding operator ENRO testing to determine the presence of object edges since the aliasing response as illustrated in FIG. 12 may then be attenuated to below the ENRO response of an abrupt edge.

The above described preferred embodiments of the present invention are by no means comprehensive and are merely exemplary of the manner in which the teachings of the present invention may be employed in order to produce a useful system for distinguishing object edges from shadow mach edges. The system of the present invention simulates the shadow contrast sensitivity of the human eye in any manner which may be utilized according to the teachings of the present invention. While the preferred embodiments describe with reference to the above specification and the accompanying drawings illustrate some ways of practicing the present invention, they are by no means inclusive. Accordingly, the scope of the present invention is defined solely by the appended claims.

What is claimed is:

1. In an image processing system, a method of distinguishing object edges from shadows in a monitored scene comprising:
   a) configuring a video sensor to multiple pixel widths to simulate the shadow contrast sensitivity of the human vision system;
   b) receiving an image with said configured video sensor to produce a received video signal; and
   c) processing said received video signal to monitor image contrast to distinguish between object edges and mach edges produced by shadows.

2. A device-implemented method of differentiating between object edges and mach edges produced by shadows in a video image containing shadows defined by an image signal produced by an image formed of a plurality of image pixels arranged in a two dimensional array comprising:
   a) determining the image intensity of each image pixel of the video image;
   b) monitoring at least an approximation of the first derivative of intensity of said monitored scene to produce edge detection signals; and
   c) screening said edge detection signals using at least an approximation of the second derivative of intensity of the monitored scene to suppress high frequency aliasing;
   said steps b) and c) of monitoring and screening distinguishing between object edges and mach edges produced by shadows to identify shadows within the image.

3. An image processing system which distinguishes object edges from shadows in a video image of a monitored scene, formed of a plurality of image pixels arranged in a two dimensional array, comprising:
   means, receiving said video image, for assembling adjacent pixels in said video image to form pixel groups of pixel width $\Delta$, said assembly means assembling said adjacent pixels to varying values of pixel width $\Delta$;
   pixel image signal production means for determining the image intensity of each image pixel group of said image to produce pixel group image signals for each pixel width $\Delta$ assembled by said assembly means; and
   processing means for processing said pixel group image signals for each pixel width $\Delta$ to monitor image contrast to distinguish between object edges and mach edges in said video image.

4. The method of claim 1 wherein said step a) configures said video sensor to each of a plurality multiple pixel widths $\Delta$, said step c) of processing the image intensity signal for each of said multiple pixel widths $\Delta$.

5. The method of claim 1 wherein said video sensor includes a video digitizing board.

6. The method of claim 4 wherein said step c) of processing includes,
   i) for each pixel width $\Delta$, taking the first difference of said image intensity signal, $DI_\Delta(x)_{first,second}$, in first and second opposed directions along each line of said image to form first and second directional edge detection signals associated with each pixel width $\Delta$.

7. The method of claim 6 wherein said first and second edge detection signals, $signal_\Delta(x)$, associated with each pixel width, are screened to reduce the aliasing response of the edge detection operator through use of the second difference of each image intensity signal $D^2I_\Delta(x)_{first,second}$, to thereby reduce the influence of high frequency noise.

8. The method of claim 7 wherein said step of reducing the aliasing response includes,
   ia) for each pixel width $\Delta$, examining each pixel x of the second difference of each image intensity signal, $D^2I_\Delta(x)_{first,second}$, for the following conditions:

$$|D^2I_\Delta(x)|>|D^2I_\Delta(x+\Delta/2)|>|D^2I_\Delta(x+\Delta)|$$

and, $$\text{sign }(D^2I_\Delta(x))=\text{sign }(D^2I_\Delta(x+\Delta/2))$$

, and
   ib) when said conditions in step ia) are satisfied, developing the first and second directional edge detection signals, $signal_\Delta(x)_{first,second}$, for each pixel width $\Delta$ where:

$$signal_\Delta(x) = \text{sign}(D^2I_\Delta(x)) \cdot \max \left\{ \begin{array}{l} |DI_\Delta(x)|, \\ |DI_\Delta(x+\Delta)|, \\ |DI_\Delta(x+2\Delta)| \end{array} \right\} /([I_m]/2)$$

and,
   $$DI_\Delta(x) = I_\Delta(x+\Delta) - I_\Delta(x)$$

and $I_m$ is the difference between the largest and the smallest intensity values in the image intensity signal.

9. The method of claim 7 wherein said step c) of processing further includes,
   ii) summing the first and second directional edge detection signals associated with each pixel width $\Delta$ to form first and second total directional edge detection signals, $signal(x)_{first,second}$;
   iii) determining the maxima in each of said first and second total directional edge detection signals, $signal(x)_{first,second}$; and
   iv) detecting the substantial positional coincidence of oppositely signed maxima in both said first and second total directional edge detection signals to detect the presence of a contrast object edge.

10. The method of claim 8 wherein said image intensity signal corresponds to the intensity of said monitored scene at image pixels which are arranged in a two dimensional array, said step i) of taking the first difference of said image intensity signal processing said image intensity along lines of said array in a first orientation and subsequently along lines of said array arranged in a second orientation non-aligned with said first orientation.

11. The method of claim 10 wherein said first and second orientations along said array are orthogonal rows and columns.

12. The method of claim 9 wherein said step c) of processing further includes,
   v) determining that there are no additional maxima closely proximate to the positionally coincident maxima detected by said step iv) to verify that an object edge has been detected.

13. The method of claim 7 wherein, in said step i), each of said first and second edge detection signals, $signal_\Delta(x)_{first, second}$, for each pixel width $\Delta$ is considered an edge operator, said step c of processing further including,
   ii) for each x, determining the number of edge operators which exceed a threshold to determining the number of responding operators at each position along each line, and iii) detecting the presence of an object edge at x by determining whether the number of responding operators exceeds a predetermined level.

14. The method of claim 13 wherein said predetermined level in step iii) exceeds the number of operators responding due to high frequency aliasing response of said image intensity signal.

15. The method of claim 13 wherein the number of responding operators, ENRO=$(\Sigma \text{ Signal}_A)/\max\{\text{Signal}_A\}$.

16. The method of claim 13 wherein said step c) of processing further includes,
   iv) summing the first and second directional edge detection signals associated with each pixel width $\Delta$ to form first and second total directional edge detection signals, signal(x)$_{first,second}$,
   v) determining the maxima in each of said first and second total directional edge detection signals, signal(x)$_{first, second}$, and
   vi) detecting the substantial positional coincidence of oppositely signed maxima in both said first and second total directional edge detection signals to further establish the presence of an object edge.

17. The method of claim 16 wherein said step c) of processing further includes,
   vii) determining that there are no additional maxima closely proximate to the positionally coincident maxima detected by said step iv) to further verify that an object edge has been detected.

18. The method of claim 1 further comprising suppressing noise in said image intensity signal without first filtering and blurring the image intensity signal.

19. The method of claim 1 further comprising selectively suppressing the aliasing response of the operators to reduce noise in said image intensity signal.

20. The method of claim 19 wherein said step of suppressing the aliasing response of the operators is performed by,
   i) selecting a signal level above that of said aliasing response to establish an aliasing threshold, and
   ii) passing only those portions of said image intensity signal which exceed said aliasing threshold to remove high frequency noise components from said signal.

21. The method of claim 10 wherein said step c) of processing further includes further reducing the aliasing response of the operators to further reduce noise in said image intensity signal.

22. The method of claim 21 wherein said step of further reducing the aliasing response of the operators is performed by,
   i) selecting a signal level above that of said aliasing response to establish an aliasing threshold, and
   ii) passing only those portions of said image intensity signal which exceed said aliasing threshold to remove high frequency noise components from said signal.

23. The method of claim 4 wherein the ratio of maximum pixel width to minimum pixel width is not greater than three to ensure that the aliasing response for the largest pixel width does not overlap the desired signal components produced by use of the smallest pixel width.

24. The method of claim 23 wherein each pixel width is substantially an integer multiple of the smallest pixel width.

25. The method of claim 4 wherein the gradation of pixel widths is finer than an integer relationship in order of improve sensitivity to high contrast edges without increasing sensitivity to undesired high frequency noise.

26. The method of claim 4 wherein said step a) of configuring is performed by employing more than one image sensor having differing effective pixel widths.

27. The method of claim 4 wherein said step a) of configuring is performed by zooming a lens of a single image sensor to provide the image sensor with images having different effective pixel widths.

28. The method of claim 4 wherein sensitivity to high contrast edges may be improved without increasing sensitivity to undesired high frequency noise by, high pass filtering image information signals related to image intensity to recover the high frequency aliasing components therefrom, thereby producing a noise signal, and subtracting the noise signal from said image information signals.

29. The method of claim 4 wherein said step c) includes recognizing object edges by,
   i) taking the first difference of said image intensity signal in first and second opposed directions along each line of said image to form first and second directional edge detection signals,
   ii) determining the maxima in said first and second directional edge detection signals, and
   iii) detecting the substantial positional coincidence of oppositely signed maxima in both said first and second directional edge detection signals to detect the presence of an object edge.

30. The method of claim 29 wherein said step of c) of processing further includes,
   iv) establishing that there are no additional maxima closely proximate to the positionally coincident maxima detected by said step iii) to verify that an object edge has been detected.

31. The method of claim 29 wherein said first and second edge detection signals, signal$_A$(x), associated with each pixel width, are screened to reduce the aliasing response of the edge detection operator through use of the second difference of each image intensity signal, $D^2I_A(x)_{first,second}$, to thereby reduce the influence of high frequency noise.

32. The method of claim 31 wherein the second difference $D^2I(x)=I(x)-2I(x+\Delta)+I(x+2\Delta)$ where x represents the position within a line of the monitored scene, I is the image intensity, and $\Delta$ is the width of a single image pixel.

33. The method of claim 32 wherein high frequency aliasing suppression is performed by,
   i) for each pixel width $\Delta$, examining each pixel x of the second difference of each image intensity signal, $D^2I_\Delta(x)_{first,second}$, for the following conditions:

$$|D^2I(x)|>|D^2I(x+\Delta/2)|>|D^2I(x+\Delta)|$$

and, $$\text{sign }(D^2I(x))=\text{sign }(D^2I(x+\Delta/2))$$

, and
   ii) developing the first and second directional edge detection signals signal(x)$_{first,second}$ where:

$$\text{Signal}(x) = \text{sign}(D^2I(x)) \cdot \max \left\{ \begin{array}{l} |DI(x)|, \\ |DI(x+\Delta)|, \\ |DI(x+2\Delta)| \end{array} \right\} /(|I_m|/2)$$

and,
   $DI(x) = I(x+\Delta) - I(x)$ and $I_m$ is the difference between the largest and the smallest intensity values in the image intensity signal.

34. The method of claim 4 wherein said step c) includes recognizing mach edges by, i) taking the first difference of said image intensity signal in first and second opposed directions along each line of said image to form first and second directional edge detection signals, ii) determining the maxima in said first and second directional edge detection signals, and iii) detecting positionally separated oppositely signed maxima pair within each of said first and second directional edge detection signals and determining the presence of a mach edge by determining whether the maxima pair within said first and second directional edge detection signals are of the same sign and positionally correspond.

35. The method of claim 34 wherein said first and second edge detection signals, $signal_A(x)$, associated with each pixel width, are screened to reduce the aliasing response of the edge detection operator through use of the second difference of each image intensity signal $D^2I_\Delta(x)_{first,second}$, to thereby reduce the influence of high frequency noise.

36. The method of claim 35 wherein the second difference is $D^2I(x)=I(x)-2I(x+\Delta)+I(x+2\Delta)$ where x represents the position within a line of the monitored scene, I is the image intensity, and $\Delta$ is the width of a single image pixel.

37. The method of claim 36 wherein high frequency aliasing suppression is performed by, i) for each pixel width $\Delta$, examining each pixel x of the second difference of each image intensity signal, $D^2I_\Delta(x)_{first,second}$, for the following conditions:

$$|D^2I(x)|>|D^2I(x+\Delta/2)|>|D^2I(x+\Delta)|$$

and, $$\text{sign }(D^2I(x))=\text{sign }(D^2I(x+\Delta/2))$$

, and ii) developing the first and second directional edge detection signals $signal(x)_{first,second}$ where:

$$Signal(x) = \text{sign}(D^2I(x)) \cdot \max \left\{ \begin{array}{l} |DI(x)|, \\ |DI(x+\Delta)|, \\ |DI(x+2\Delta)| \end{array} \right\} /(I_{m/2})$$

and,
$DI(x) = I(x + \Delta) - I(x)$ and $I_m$ is the difference between the largest and the smallest intensity values in the image intensity signal.

38. The method of claim 29 wherein said step i) of taking is repeated for each one of said multiple pixel widths.

39. The method of claim 34 wherein said step i) of taking is repeated for each one of said multiple pixel widths.

40. A device-implemented method of detecting edges in a video image comprising:

a) providing a video sensor;

b) producing an image signal defining a video image containing shadows formed of a plurality of image pixels arranged in a two dimensional array using said video sensor;

c) determining the image intensity of each image pixel of said video image;

d) monitoring at least an approximation of the first derivative of intensity of said monitored scene to produce edge detection signals; and e) screening said edge detection signals using at least an approximation of the second derivative of intensity of the monitored scene to suppress high frequency aliasing;

said steps d) and e) of monitoring and screening distinguishing between object edges and mach edges produced by shadows to identify shadows within the image.

41. The method of claim 40 wherein said step c) of determining image intensity comprises:

i) configuring the video sensor to multiple pixel sizes, and ii) monitoring the intensity of the monitored scene for each of said multiple pixel sizes.

42. A device-implemented method of detecting edges in a video image comprising:

a) providing a video sensor;

b) producing an image signal defining a video image containing shadows formed of a plurality of image pixels arranged in a two dimensional array using said video sensor;

c) determining the image intensity of each image pixel of said video image;

d) taking at least an approximation of the first derivative of image intensity in a first direction across each row of said array to form a first difference signal;

e) taking at least an approximation of the second derivative of image intensity to form a screening signal;

f) determining whether the screening signal meets predetermined screening conditions at each location of each row of said array;

g) at each location of each row of said array, if said screening signal meets said screening conditions as determined by said step f), using said first difference signal developed in said step d) of determining as a first directional edge detection signal;

h) repeating said steps d)–g) in a second direction to form a second directional edge detection signal;

i) varying the size of each image pixel in said step c) to produce alternately sized pixels;

j) repeating said steps d)–h) for each alternate size of pixels; and k) using said edge detection signals to distinguish between object edges and mach edges in the video image produced by the video sensor to identify shadows within the image.

43. The method of claim 42 wherein said step k) includes recognizing object edges by, i) adding the first directional edge detection signals for each of said pixel sizes together to develop a total first edge detection signal and adding the second directional edge detection signals together to develop a total second edge detection signal, ii) locating the maxima in said total first and second edge detection signals, and iii) detecting the substantial positional coincidence of oppositely signed maxima in both said first and second total edge detection signals to detect the presence of an object edge.

44. The method of claim 42 wherein said step k) includes recognizing mach edges by, i) adding the first directional edge detection signals for each of said pixel sizes together to develop a total first edge detection signal and adding the second directional edge detection signals together to develop a total second edge detection signal, ii) locating the maxima in said total first and second edge detection signals, and iii) detecting positionally separated oppositely signed maxima pair within each of said total first and second edge detection signals and determining the presence of a mach edge by determining whether the maxima pair within said total first and second edge detection signals are of the same sign and positionally correspond.

45. The method of claim 42 wherein each of the first and second directional edge detection signals is an edge operator, said step k) including recognizing object edges by, i) determining the number of edge operators which exceed a threshold to determining the number of responding operators at each position along each line, and ii) detecting the presence of an object edge by determining whether the number of responding operators exceeds a predetermined level.

46. An image processing system which distinguishes object edges from shadows in a monitored scene comprising:

a video sensor producing an image intensity signal representative of the monitored scene as an output thereof;

means, operatively connected to said video sensor, for configuring the output of said video sensor to multiple pixel widths to simulate the shadow contrast sensitivity of the human vision system; and processor means, responsive to the configured output of said video sensor, for monitoring image contrast and distinguishing between object edges and mach edges produced by shadows in said monitored scene.

47. The system of claim 46 wherein said means for configuring configures at least the output of said video sensor to each of a plurality of multiple pixel widths $\Delta$, said processor means processing the image intensity signal for each of said multiple pixel widths $\Delta$.

48. The system of claim 47 wherein said means for configuring configures said video sensor to said multiple pixel widths $\Delta$.

49. The system of claim 47 wherein said processor means includes, means for taking the first difference of said image intensity signal, $DI_\Delta(x)_{first,second}$, for each pixel width $\Delta$, in first and second opposed directions along each line of said image to form first and second directional edge detection signals associated with each pixel width $\Delta$.

50. The system of claim 49 further comprising means for screening said first and second edge detection signals, $signal_\Delta(x)$, associated with each pixel width, to reduce the aliasing response of the edge detection operator through use of the second difference of each image intensity signal, $D^2I_\Delta(x)_{first,second}$, to thereby reduce the influence of high frequency noise.

51. The system of claim 50 wherein said image intensity signal corresponds to the intensity of said monitored scene at image pixels which are arranged in a two dimensional array, said means for taking the first difference of said image intensity signal processing said image intensity along lines of said array in a first orientation and subsequently along lines of said array arranged in a second orientation non-aligned with said first orientation.

52. The system of claim 50 wherein said processor means further includes, means for summing the first and second directional edge detection signals associated with each pixel width $\Delta$ to form first and second total directional edge detection signals, $signal(x)_{first,second}$, means for determining the maxima in each of said first and second total directional edge detection signals, $signal(x)_{first,second}$, and means for detecting the substantial positional coincidence of oppositely signed maxima in both said first and second total directional edge detection signals to detect the presence of an object edge.

53. The system of claim 52 wherein said processor means further includes, means for determining that there are no additional maxima closely proximate to the positionally coincident maxima detected by said means for detecting to verify that a high contrast object edge has been detected.

54. The system of claim 50 wherein, each of said first and second edge detection signals, $signal_\Delta(x)_{first,second}$, for each pixel width $\Delta$ is considered an edge operator, said processor means further including, means for determining the number of edge operators which exceed a threshold to determining the number of responding operators at each position along each line, and means for detecting the presence of an object edge by determining whether the number of responding operators exceeds a predetermined level.

55. The system of claim 54 wherein the number of responding operators, $ENRO=(\Sigma\ Signal_\Delta)/\max\{Signal\Delta\}$.

56. The system of claim 50 wherein the ratio of maximum pixel width to minimum pixel width of the configured output of said video sensor is not greater than three to ensure that the aliasing response for the largest pixel width does not overlap the desired signal components produced by use of the smallest pixel width.

57. The system of claim 50 wherein said processor means recognizes lower contrast mach edges and includes, means for taking the first difference of said image intensity signal in first and second opposed directions along each line of said image to form first and second directional edge detection signals, means for determining the maxima in said first and second directional edge detection signals, and means for detecting positionally separated oppositely signed maxima pair within each of said first and second directional edge detection signals and determining the presence of a mach edge by determining whether the maxima pair within said first and second directional edge detection signals are of the same sign and positionally correspond.

58. A device-implemented method of detecting edges in a video image comprising:

a) providing a video sensor;

b) producing an image signal defining a video image containing shadows formed of a plurality of image pixels arranged in a two dimensional array using said video sensor;

c) assembling adjacent pixels in said image to form pixel groups of pixel width $\Delta$;

d) determining the image intensity of each image pixel group of said image to produce pixel group image signals;

e) repeating steps c) and d) for varying values of $\Delta$ to form multiple pixel width pixel group image signals; and f) processing said multiple pixel width pixel group image signals to monitor image contrast to distinguish between object edges and mach edges to identify shadows in said video image.

59. The method of claim 58 wherein said step e) of processing includes, i) taking at least an approximation of the first derivative of intensity of each of said pixel group signals to produce edge detection signals; and ii) screening said edge detection signals using at least an approximation of the second derivative of intensity of the monitored scene to suppress high frequency aliasing;

iii) repeating said steps i) and ii) of monitoring and screening for each of said varying values of $\Delta$ in order to detect Mach edges.

60. The method of claim 59 wherein said step d) of determining image intensity comprises:

i) configuring the video sensor to multiple pixel sizes $\Delta$, and ii) monitoring the intensity of the monitored scene for each of said multiple pixel sizes $\Delta$.

61. An image processing system which distinguishes object edges from shadows in a monitored scene comprising:

a video sensor producing a video image of the monitored scene, formed of a plurality of image pixels arranged in a two dimensional array;

means, operatively connected to said video sensor, for assembling adjacent pixels in said video image to form pixel groups of pixel width $\Delta$, said assembly means assembling said adjacent pixels to varying values of pixel width $\Delta$;

pixel image signal production means for determining the image intensity of each image pixel group of said image to produce pixel group image signals for each pixel width $\Delta$ assembled by said assembly means; and processing means for processing said pixel group image signals for each pixel width $\Delta$ to monitor image contrast to distinguish between object edges and mach edges in said video image.

62. An image processing system which distinguishes object edges from shadows in a monitored scene having a plurality of image pixels arranged in a two dimensional array, comprising:

means for assembling the pixels of the monitored scene into multiple pixel assemblies of varying widths to simulate the shadow contrast sensitivity of the human vision system; and processor means, responsive to said means for assembling, for monitoring image contrast and distinguishing between object edges and mach edges produced by shadows in said monitored scene.

* * * * *

UNITED STATES PATENT AND TRADEMARK OFFICE
CERTIFICATE OF CORRECTION

PATENT NO.    : 5,495,536
DATED         : February 27, 1996
INVENTOR(S)   : Gordon C. Osbourn It is certified that error appears in the above-identified patent and that said Letters Patent is hereby corrected as shown below:

Column 1, line 5, add the following new section:

--Notice of Government Interest

The United States Government has rights in this invention pursuant to Contract No. DE-AC04-76DP00789 between Sandia Corporation and the U.S. Department of Energy.--

Signed and Sealed this

Sixth Day of August, 1996

Attest:

BRUCE LEHMAN

*Attesting Officer*     Commissioner of Patents and Trademarks